United States Patent
Watanabe et al.

[11] Patent Number: 5,949,943
[45] Date of Patent: Sep. 7, 1999

[54] WAVEGUIDE DEVICE AND A METHOD OF PRODUCING THE SAME

[75] Inventors: Osamu Watanabe, Nagoya; Masaaki Tsuchimori, Owariasahi; Akane Okada, Obu; Hiroshi Ito, Kasugai, all of Japan

[73] Assignee: Kabushiki Kaisha Toyota Chuo Kenkyusho, Aichi-ken, Japan

[21] Appl. No.: 08/956,401

[22] Filed: Oct. 23, 1997

[30] Foreign Application Priority Data

| Oct. 23, 1996 | [JP] | Japan | 8-280621 |
| Jul. 1, 1997 | [JP] | Japan | 9-175652 |
| Jul. 2, 1997 | [JP] | Japan | 9-176766 |
| Jul. 25, 1997 | [JP] | Japan | 9-200176 |

[51] Int. Cl.$^6$ ............... G02B 6/10; G02B 6/18
[52] U.S. Cl. ............... 385/129; 385/11; 385/37
[58] Field of Search ............ 385/11, 37, 129–132; 430/290

[56] References Cited

U.S. PATENT DOCUMENTS

| 3,874,782 | 4/1975 | Schmidt | 385/8 |
| 4,400,052 | 8/1983 | Alferness et al. | 385/132 |
| 4,948,407 | 8/1990 | Bindell et al. | 65/3.14 |
| 5,202,938 | 4/1993 | Man et al. | 385/11 |
| 5,732,177 | 3/1998 | Deacon et al. | 385/122 |

FOREIGN PATENT DOCUMENTS 62-299913  12/1987  Japan .

OTHER PUBLICATIONS

M. B. J. Diemeer, et al., Photoinduced Channel Waveguide Formation in Nonlinear Optical Polymers, Electronics Letters, vol. 26, No. 6, Mar. 15, 1990, pp. 379–380.

*Primary Examiner*—John D. Lee
*Assistant Examiner*—Juliana K. Kang
*Attorney, Agent, or Firm*—Oblon, Spivak, McClelland, Maier & Neustadt, P.C.

[57] ABSTRACT

A waveguide device having a waveguide layer provided with a core and a cladding, and having a mode filter function of propagating either of TE mode polarized light and TM mode polarized light, wherein the core and the cladding are formed of a variable anisotropic refractive index material or a material in which a variable anisotropic refractive index material is dispersed in a matrix. Upon photoirradiation, the refractive indices ($n_o$, $n_e$) of the core and the cladding can be changed to satisfy the formulae: one of $n_o$ and $n_e$ of the core is greater than that of the cladding, and the other of $n_o$ and $n_e$ of the core is less than or equal to that of the cladding, wherein $n_o$ is the ordinary refractive index and $n_e$ is the extraordinary refractive index. This waveguide device can be an important constitutional component in a compact optical system. A method of producing the waveguide device is also disclosed.

14 Claims, 13 Drawing Sheets

FIG. 1
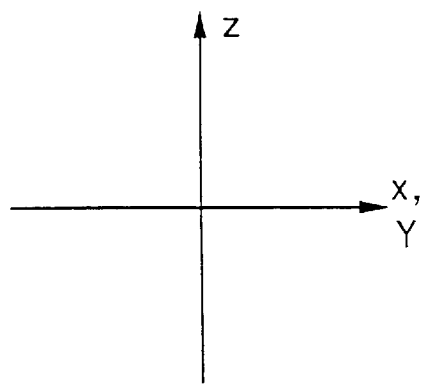
FIG. 2(A)
FIG. 2(B)   FIG. 2(C)
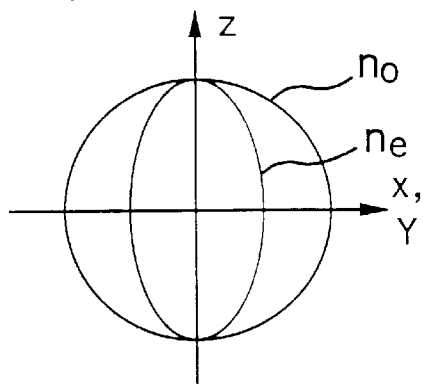 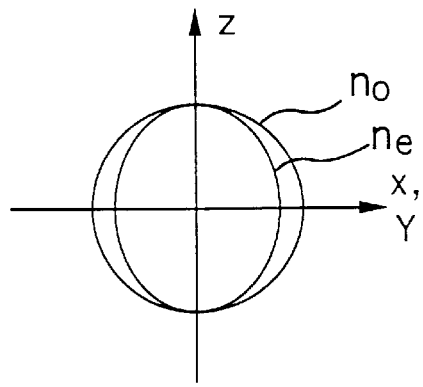
FIG. 2(D)
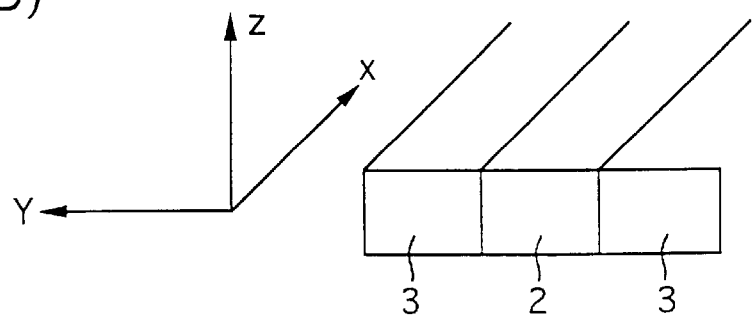

FIG. 3
| $n_o = 1.706$ | $n_o = 1.702$ | $n_o = 1.706$ |
|---|---|---|
| $n_e = 1.676$ | $n_e = 1.680$ | $n_e = 1.676$ |
| 3 | 2 | 3 |
FIG. 4
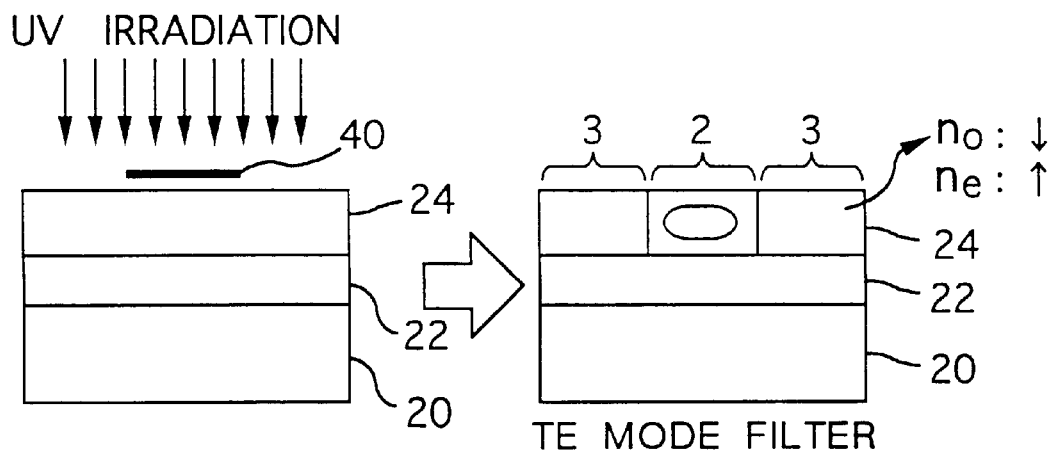
FIG. 5
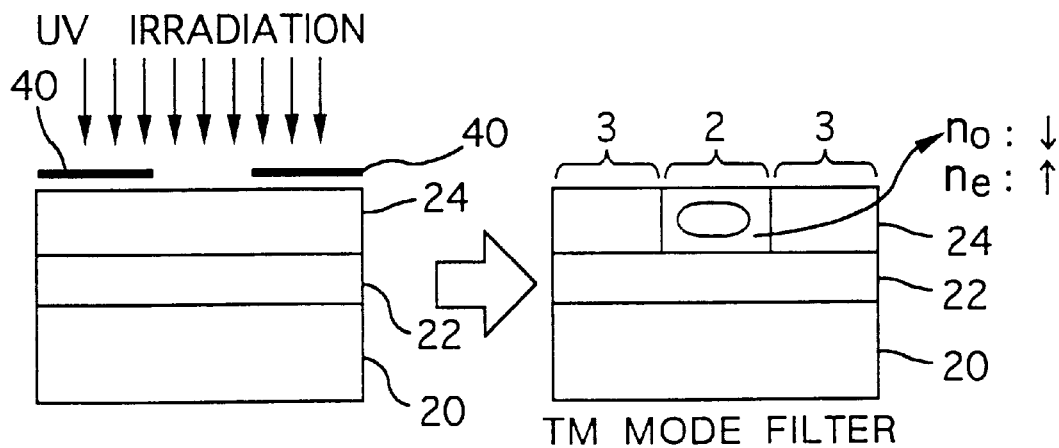

WAVEGUIDE DEVICE AND A METHOD OF PRODUCING THE SAME

BACKGROUND OF THE INVENTION

1. Field of the Invention

This invention relates to a waveguide device having a mode filter function of selectively transmitting either of TE mode polarized light and TM mode polarized light, and a method of producing the same.

2. Description of the Related Art

Conventionally, a method called 'photobleaching' by photoirradiation has been proposed as one method of producing a channel-type waveguide (see Electronics Lett., 26, 1990, page 379). This is a method in which, with a photomask placed, light is irradiated on a part deposited on a substrate and becoming a waveguide layer, thereby decreasing the refractive index of the light irradiated part and producing a waveguide provided with a core which confines and propagates light. This method relates to a waveguide layer constituted by an optically isotropic material, and an analysis of optically anisotropic material has not been attempted yet. Application of this method to a waveguide device serving as a mode filter or the like has not been attempted, either.

Moreover, a waveguide device disclosed as the prior art in FIG. 4 of Japanese Unexamined Patent Publication (KOKAI) No.62-299913 has been known as a conventional waveguide device functioning as a mode filter. In this waveguide device, a metal is placed on a core of a glass waveguide, or an optically anisotropic crystal (e.g., calcite, a $Nb_2O_5$ film) which has a different refractive index from that of a core of a glass waveguide is placed on the core of the glass waveguide. Because the optically anisotropic crystal which has a different refractive index from that of the core of the glass waveguide is thus placed on the core of the glass waveguide, there have been a problem in which steps become complicated to produce this device with precision. Further, this art is under restrictions in which refractive indices of optically anisotropic crystals are constant and crystals with desired anisotropic refractive indices cannot be always obtained.

The art shown in FIGS. 1 to 3 of the above Japanese unexamined patent publication was developed in an attempt to dissolve the above problems, and is that a film having an equal or substantially equal refractive index to that of a core of a waveguide is placed in the neighborhood of the core of the waveguide, so that either of TE mode polarized light and TM mode polarized light is irradiated and the other is propagated.

SUMMARY OF THE INVENTION

It is an object of a first aspect of the present invention to provide a waveguide device of a different type from that of the waveguide device according to the art of the above publication, and more particularly, a waveguide device having a mode filter function of selectively propagating either of TE mode polarized light and TM mode polarized light by employing a variable anisotropic refractive index material.

It is an object of a second aspect of the present invention to provide a waveguide device which can select a wavelength of light propagated, in addition to attaining the object of the first aspect of the invention.

It is an object of a third aspect of the present invention to provide a waveguide device which has both the function of a mode filter and the function of a light modulator, in addition to attaining the object of the first aspect of the invention.

It is an object of a fourth aspect of the present invention to provide a waveguide device in which three-dimensional (principal) refractive indices $n_x$, $n_y$, $n_z$ are controlled, in addition to attaining the object of the first aspect of the invention.

It is an object of a fifth aspect of the present invention to provide a method of producing the waveguide device having a mode filter function, according to the first aspect of the invention.

It is an object of a sixth aspect of the present invention to provide a method of producing the waveguide device having a grating, according to the second aspect of the invention.

It is an object of a seventh aspect of the present invention to provide a method of producing the waveguide device having a light modulator, according to the third aspect of the invention.

It is an object of an eighth aspect of the present invention to provide a method of producing the waveguide device in which three-dimensional refractive indices $n_x$, $n_y$, $n_z$ are controlled, according to the fourth aspect of the invention.

The waveguide device according to the first aspect of the present invention is a waveguide device having a waveguide layer, said waveguide layer comprises:

a core of a material with a variable anisotropic refractive index or the same dispersed in a matrix, the core having an ordinary refractive index ($n_o$) and an extraordinary refractive index ($n_e$); and a cladding of a material with a variable anisotropic refractive index or the same dispersed in a matrix, the cladding disposed on the core and having an ordinary refractive index ($n_o'$) and an extraordinary refractive index ($n_e'$), wherein these indices satisfy the formula of $n_o > n_o'$ and $n_e \leq n_e'$, or the formula of $n_e > n_e'$ and $n_o \geq n_o'$, whereby the waveguide device performs a mode filter function of propagating either of TE mode polarized light and TM mode polarized light.

In the present invention, the term 'core' means a medium through which light is propagated. The term 'cladding' means a medium which contacts or covers a core so that light is confined and propagated within the core. By making the refractive index of the core slightly higher than the refractive index of the cladding, light is confined and propagated within the core.

By employing a variable anisotropic refractive index material as a core and a cladding, the refractive index ($n_o$, $n_e$) of the core and the refractive index ($n_o$, $n_e$) of the cladding can be changed by photoirradiation. Thus, the above waveguide device according to the first aspect of the present invention can be provided.

In general optical systems, control and measurement using TM mode and TE mode polarized light are often conducted, and in these systems, a polarizer is an essential element. In the meanwhile, compact optical systems using waveguide devices have been developed in order to utilize optical systems for more general purposes. In these compact optical systems as well as the aforementioned optical systems, there is a need of separating TM mode polarized light and TE mode polarized light from each other. In this respect, because one of TM mode polarized light and TE mode polarized light is propagated and the other is irradiated, the waveguide device according to the first aspect of the present invention can serve as a mode filter which is capable of separating TM mode polarized light and TE mode polarized light from each other, and can be an important component part in compact optical systems.

A waveguide device according to the second aspect of the present invention is characterized in that a part of the waveguide layer constitutes a mode filter which has the refractive index relation according to the first aspect of the present invention of selectively propagating either of TE mode polarized light and TM mode polarized light and radiating the other, and at least a portion of other parts of the waveguide layer constitutes a grating having a refractive index modulating structure.

In the waveguide device according to the second aspect of the present invention, a part of said waveguide layer constitutes a mode filter which propagates either of TE mode polarized light and TM mode polarized light and irradiates the other, and at least a portion of other parts of the waveguide layer constitutes a grating which selects the wavelength of light. Therefore, the waveguide layer constituting the mode filter and the grating can be an integral component formed of the same material. Therefore, it is possible to obtain an optical integrated element which is simple in construction and production processes.

In addition, in the waveguide device according to the second aspect of the present invention, the waveguide structure of the mode filter and the waveguide structure of the grating are formed of the same material and integrally connected to each other. Therefore, coupling loss at a part connecting the mode filter and the grating can be suppressed to small values.

A waveguide device according to the third aspect of the present invention is characterized in that a part of said waveguide layer constitutes a mode filter which has a refractive index relation of selectively propagating either of TE mode polarized light and TM mode polarized light and radiating the other, and other parts of the waveguide layer constitute a light modulator which varies refractive index of light propagating within the waveguide layer upon application of an electric field so as to modulate the light.

In the waveguide device according to the third aspect of the present invention, a part of the waveguide layer constitutes a mode filter which selectively propagates either of TE mode light and TM mode light, and other parts of the waveguide layer constitute a light modulator which varies refractive index with respect to light propagating within the waveguide layer so as to modulate the light. Therefore, the waveguide layer constituting the mode filter and the light modulator can be an integral element formed of the same material. Therefore, it is possible to obtain an optical integrated element which is simple in construction and production processes.

Moreover, the waveguide structure of the mode filter and the waveguide structure of the light modulator are integrally connected to each other and formed of the same material. Therefore, coupling loss at a part connecting the mode filter and the light modulator can be suppressed to small values.

In regard to the waveguide devices according to the second and third aspects of the present invention, by controlling $n_e$ and $n_o$ of the waveguide layer of the mode filter by the use of photoirradiation, the refractive indices of the core and the cladding can be set to have either of the two refractive index relations defined in the first aspect of the present invention, and thus a mode filter which selectively propagates only either of TE mode and TM mode can be constituted.

In a waveguide device according to the fourth aspect of the present invention, waveguide structures in which three-dimensional refractive index is controlled so that planar refractive indices $n_x$, $n_y$, have different values from each other and perpendicular-to-the-plane refractive index $n_z$ has a different value from $n_x$ and $n_y$, are provided on an input end side to which signal light is coupled and on an output end side from which signal light is outgoing, and the waveguide device has waveguide width on the input end side greater than waveguide width on the output end side in the core.

Because waveguide width on the input end side is greater than waveguide width on the output end side, loss in coupling the waveguide device to other devices can be decreased.

The waveguide device production method according to the fifth aspect of the present invention, a method of producing the waveguide device according to claim 1, comprises the step of:

irradiating light on either of a part to become said core and a part to become said cladding of a device material formed of a material with a variable anisotropic refractive index or the same dispersed in a matrix, thereby obtaining the waveguide device according to the first aspect of the present invention.

In the waveguide device production method according to the fifth aspect of the present invention, because the refractive index ($n_o$ and $n_e$) of the core and the refractive index ($n_o$ and $n_e$) of the cladding can be changed by photoirradiation, the waveguide device according to the first aspect of the present invention can be produced effectively.

As for the anisotropic crystals disclosed in Japanese Unexamined Patent Publication (KOKAI) No.62-29913, the refractive indices are constant. In the present invention, however, because variable anisotropic refractive index materials of which refractive indices can be varied by photoirradiation are employed as mentioned above, greater freedom of design can be obtained when compared with the case where the anisotropic crystals disclosed in the above publication technique are employed. Also, the costs of the above materials tend to be lower than the costs of the anisotropic crystals disclosed in the above Japanese publication. In contrast to the technique shown in FIG. 4 of the Japanese Unexamined Patent Publication (KOKAI) No.62-29913, the waveguide device production method according to the fifth aspect of the present invention is advantageous in providing a waveguide device at low costs.

Moreover, because the part to become the core and the part to become the cladding are integrally formed of the same material before photoirradiation, individual assembling and fabricating of the core and the cladding is no more required. So, it is advantageous in simplifying the production processes of the waveguide device.

A method according to the sixth aspect of the present invention enables to produce the waveguide device having a grating according to the second aspect of the present invention. A method according to the seventh aspect of the present invention enables to produce the waveguide device having a light modulator according to the third aspect of the present invention. A method according to the eighth aspect of the present invention enables to produce the waveguide device according to the fourth aspect of the present invention in which refractive index is three-dimensionally controlled.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIG. 1 is a cross-sectional schematic diagram of a waveguide layer comprising a core and claddings and serving as a TE mode filter;

FIG. 2(A) shows principal axes (X, Y, Z-axes) of refractive index, FIG. 2(B) shows index surface of the core, FIG. 2(C) shows index surface of the claddings and FIG. 2(D) shows a part of waveguide with three-dimension directions;

FIG. 3 is a cross-sectional schematic diagram of another waveguide layer comprising a core and claddings and serving as a TM mode filter;

FIG. 4 is a schematic diagram of production processes of a TE mode filter;

FIG. 5 is a schematic diagram of production processes of a TM mode filter;

FIG. 23(A) shows principal axes (X, Y, Z-axes) of refractive index; FIG. 23(B) shows refractive indices before photoirradiation; FIG. 23(C) shows refractive indices after photoirradiation.

DETAILED DESCRIPTION OF THE PREFERRED EMBODIMENTS

Figure 6:
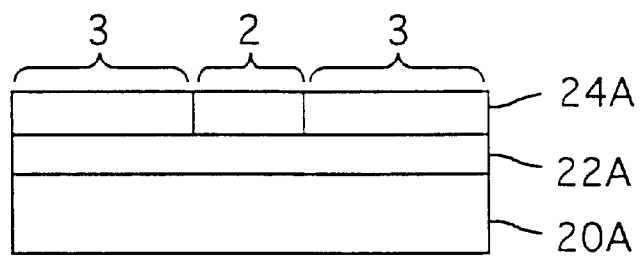
FIG. 6 is a cross-sectional schematic diagram of a mode filter of Example 1.

The First Preferred Embodiment (1) Now, a first preferred embodiment according to the first aspect of the invention will be described. A typical waveguide device of the first preferred embodiment is a mode filter having a function of confining and propagating either of TE mode polarized light and TM mode polarized light, and radiating the other.

A mode filter shown in FIG. 1 irradiates TM mode polarized light, but confines and propagates TE mode polarized light within a core 2. In the mode filter shown in FIG. 1, $n_o$ is set to satisfy the formula: $n_o$ of the core 2>$n_o$ of the claddings 3, and $n_e$ is set to satisfy the formula: $n_e$ of the core 2<$n_e$ of the claddings 3.

Because $n_o$ of the core 2 is greater than $n_o$ of the claddings 3, the mode filter shown in FIG. 1 can confine and propagate TE mode polarized light within the core 2. On the other hand, because $n_e$ of the core 2 is less than or equal to $n_e$ of the claddings 3, this mode filter cannot confine TM mode polarized light within the core 2 and irradiates TM mode polarized light to the outside. As a result, the mode filter shown in FIG. 1 can function as a mode filter which can propagate TE mode polarized light alone within the core 2 and output TE mode polarized light alone.

When X, Y, Z-axes of the refractive index of a variable anisotropic refractive index material are defined as shown in FIG. 2(A), FIG. 2(B) shows an index surface of the core 2 of the above mode filter, and FIG. 2(C) shows an index surface of the claddings 3 of the above mode filter. In this case, the z-axis is an optic axis of wave normal.

In the mode filter shown in FIG. 1, the air layer above and/or below the core 2 may be used as cladding(s). Otherwise, in addition to the claddings 3 disposed beside the core 2 and shown in FIG. 1, other claddings may exist at the upper and lower positions of the core 2. In this case, a material constituting the claddings at the upper and lower positions may have the same refractive index as that of the claddings 3 disposed beside the core 2, or may have different refractive index from that of the claddings 3 as long as the performance of the mode filter having a waveguide function is not damaged. In general, a mode filter is easily constituted, if a cladding material with a lower refractive index than that of the claddings 3 is employed as the claddings at the upper and lower positions.

(2) In a mode filter shown in FIG. 3, $n_e$ is set to satisfy the formula: $n_e$ of the core 2>$n_e$ of the claddings 3, and $n_o$ is set to satisfy the formula: $n_o$ of the core 2<$n_o$ of the claddings 3. Because n of the core 2 is greater than n of the claddings 3, this mode filter propagates only TM mode polarized light within the core 2. In addition, because no of the core 2 is less than or equal to $n_o$ of the claddings 3, this mode filter irradiates TE mode polarized light. As a result, a mode filter which outputs only TM mode polarized light can be obtained.

(3) The first aspect of the present invention relates to a device using two kinds of anisotropic refractive indices of the core and cladding. This type of waveguide device can be attained by employing a variable anisotropic refractive index material or a material comprising a matrix and a variable anisotropic refractive index material dispersed therein.

(4) The production method according to the fifth aspect of the invention is a method of producing the waveguide device according to the first aspect of the invention effectively, and more particularly a method of changing the anisotropic refractive index of a variable anisotropic refractive index material. In practice, this is achieved by irradiating light such as ultraviolet rays on the variable anisotropic refractive index material.

In variable anisotropic refractive index materials, control of the change in anisotropic refractive index can be achieved by photoirradiation. Although the refractive indices of the anisotropic crystals disclosed in the aforementioned Japanese publication are constant, far more freedom in design can be obtained in the present invention when compared with the case of employing the anisotropic crystals disclosed in the aforementioned Japanese publication.

A part to become the core 2 and a part to become the claddings 3 are integrally formed of the same kind of material before photoirradiation. Therefore, individual assembling and fabricating of the core 2 and the claddings 3 is no more required, and this is advantageous in simplifying the production processes of the waveguide device.

(5) Variable anisotropic refractive index materials

The term 'variable anisotropic refractive index materials' used in the present invention means materials in which anisotropic refractive index is shown before photoirradiation, and the refractive index is changed by the photoirradiation, and the change in the refractive index caused by the photoirradiation includes both an increased component and a decreased component.

The variable anisotropic refractive index materials are materials the whole or part of which can be changed structurally by photoirradiation. Examples of materials having this character include chemical compounds having trans-cis photoisomerizable carbon-carbon double bond or azo group. To obtain a desired refractive index change, it is important to use molecules having a large anisotropic refractive index change, and it is preferable to use azobenzene derivatives or stilbene derivatives. By bonding such a functional group as alkyl group, carboxyl group, nitro group, cyano group, amino group, methoxyl group to these derivatives, a larger anisotropic change can be obtained.

Moreover, by introducing such an electron attractive group as nitro group and cyano group, and such an electron donating group as amino group and methoxyl group at both the ends of the respective molecules, a much larger anisotropic change can be obtained.

Due to continuous photoirradiation, the above materials sometimes experience reduction, oxidation, scission, or the like of carbon—carbon double bond or azo group, but this does not substantially matter as long as a desired change is obtained. It is assumed that this is rather preferable than the case where cis-trans isomerization is thermally caused and the refractive index is returned to the original one.

By making these photoisomerizable chemical compounds dispersed in or bonded to polymers, or dispersed in or bonded to suitable matrices such as glass and resin, desired variable anisotropic refractive index materials according to the present invention can be provided. As a matrix resin, any resin can be employed as long as a variable anisotropic refractive index material can be mixed in that matrix resin at a controllable ratio. Examples of the matrix resins include such thermoplastic resins as urethane resin, polyester resin, acrylic resin and styrene resin and such thermosetting resins as phenol resin.

The above materials can show anisotropic refractive index before photoirradiation, by orienting molecules in a plane along the surface of the substrate by a spin coating process, a melting-extrusion molding process or the like. The degree of anisotropy can be controlled by adjusting viscosity of the materials, rotational speed in a spin coating process, the draw ratio of the materials in molding, or the like. When strong anisotropy is desired, it is preferable to use polymers or matrices having a strongly anisotropic chemical structure.

(6) Materials With a Low Propagation Loss

It is preferable that variable anisotropic refractive index materials and matrices are materials with a low propagation loss. Materials with a low propagation loss means materials which can provide sufficient output light intensity when used as waveguide devices. In general, the wavelength of light propagated through a waveguide device is in the range from visible rays to near infrared rays. When visible rays are propagated through a waveguide device, materials which have a low propagation loss in that range can be employed. When near infrared rays are propagated through a waveguide device, materials which have a low propagation loss in that range can be employed.

As materials with a low propagation loss, it is possible to use, as they are, variable anisotropic refractive index materials which are obtained by making photoisomerizable chemical compounds dispersed in or bonded to polymers, or dispersed in or bonded to suitable matrices, and it is also possible to use variable anisotropic refractive index materials by mixing them with other matrices, as long as they have a desired low propagation loss. Any matrix can be used as long as variable anisotropic refractive index materials can be dispersed in that matrix at a controllable ratio. For example, glass and polymeric materials can be employed as matrices.

(7) Photoirradiation

Photoirradiation can be employed in order to cause refractive index change to variable anisotropic refractive index materials. Photoirradiation is carried out at a wavelength which causes photoisomerization in variable anisotropic refractive index materials. Generally, light having a wavelength in the range from the ultraviolet rays to the visible rays is irradiated on variable anisotropic refractive index materials. As a light source, a high pressure mercury lamp is generally used but an excimer laser or other suitable light source can also be used.

In irradiating light, necessary optical power and time to cause a desired refractive index change in variable anisotropic refractive index materials are appropriately selected. Moreover, if light is irradiated with the temperature of variable anisotropic refractive index materials increased in order to shorten production time, efficiency in changing the refractive indices of the variable anisotropic refractive index materials tends to be increased in general.

The above optical power, irradiation time, temperature during photoirradiation or the like are appropriately selected in accordance with the kind of variable anisotropic refractive index materials, film thickness and the type of waveguide devices. For example, a desired waveguide mode filter can be obtained by irradiating ultraviolet rays at a central wavelength of 365 nm under the following conditions: optical power is 80 mW/cm$^2$, irradiation temperature is in the range from room temperature to 160° C., and irradiation time is from 30 minutes to one hour. If optical power is increased, irradiation time can be shortened.

Figure 8:
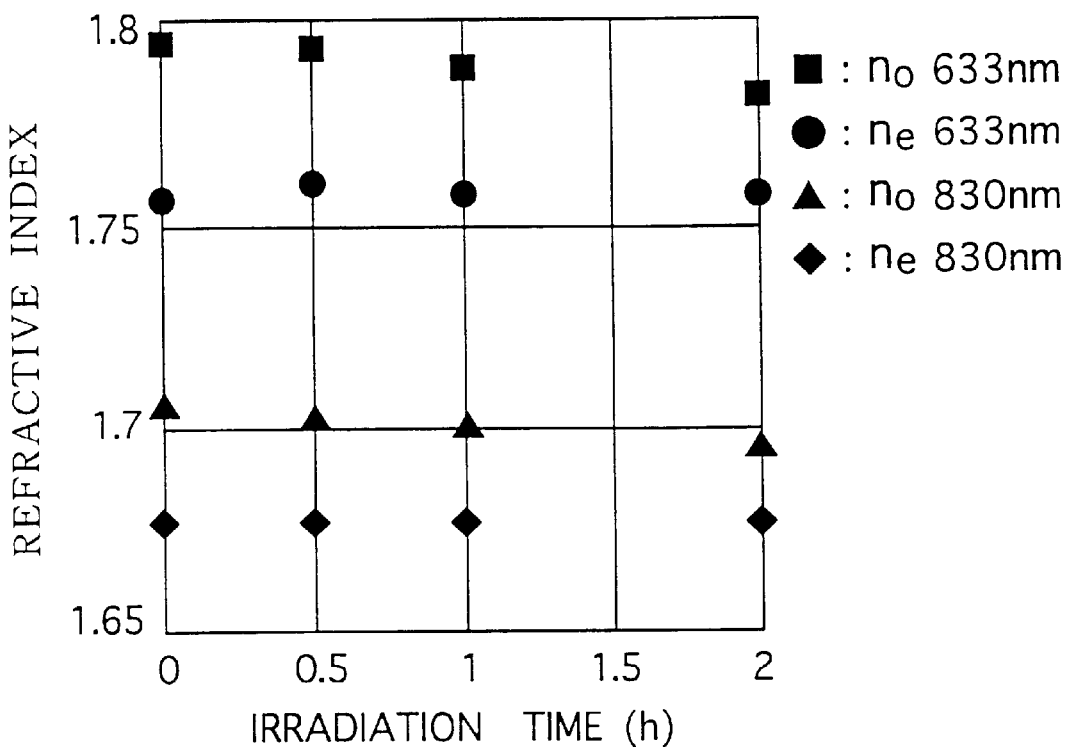
FIG. 8 is a graph showing the relation between irradiation time and refractive index of a variable anisotropic refractive index material of Example 1.

The relation between irradiation time and the degree of change in the refractive index is shown in FIG. 8. As understood from the experiment results shown in FIG. 8, in the above variable anisotropic refractive index materials, ordinary refractive indices $n_o$ tend to be decreased as denoted by solid squares and triangles, and extraordinary refractive indices $n_e$ tend to be increased as denoted by solid diamonds and circles.

(8) Mode Filter

A mode filter is typically employed as a waveguide device. Referring now to FIG. 4, a mode filter will be described. The mode filter shown in FIG. 4 comprises a substrate 20, an undercladding 22 deposited on the substrate 20, and a waveguide layer 24 deposited on the undercladding 22. As shown in FIG. 4, light such as ultraviolet rays is irradiated, with parts to become claddings 3 exposed to the light while a part to become a core 2 covered with a photomask 40. In the parts exposed to the light, i.e., the parts to become the claddings 3, $n_o$ is decreased and $n_e$ is increased, as understood from the experiment results shown in FIG. 8.

Therefore, after photoirradiation, the formula: $n_o$ of the core 2 > $n_o$ of the claddings 3 and the formula: $n_e$ of the core $2 \leq n_e$ of the claddings 3 are satisfied. . . . (1—1)

As mentioned before, because $n_o$ of the core 2 is greater than $n_o$ of the claddings 3, TE mode polarized light can be confined and propagated within the core 2. On the other hand, because $n_e$ of the core 2 is less than or equal to $n_e$ of the claddings 3, TM mode polarized light cannot be confined within the core 2, and is irradiated. As a result, this mode filter can serve as a TE mode filter which can output only TE mode polarized light.

Next, FIG. 5 shows another mode filter, a TM mode filter. Referring to FIG. 5, this mode filter comprises a substrate 20, an undercladding 22 deposited on the substrate 20, and a waveguide layer 24 deposited on the undercladding 22.

As shown in FIG. 5, light such as ultraviolet rays is irradiated, with a part to become the core 2 exposed to the light while parts to become the claddings 3 covered with a photomask 40. In the part exposed to the light, i.e., the part to become the core 2, $n_o$ is decreased and $n_e$ is increased in the same way as above by the photoirradiation.

Therefore, in this mode filter, the formula: $n_e$ of the core 2 > $n_e$ of the claddings 3 and the formula: $n_o$ of the core 2 < $n_o$ of the claddings 3 are satisfied. . . . (1-2)

Therefore, a TM mode filter which can output only TM mode polarized light can be obtained.

With regard to the mode filter shown in FIG. 4 and the mode filter shown in FIG. 5, before photoirradiation, both the part to become the core 2 and the parts to become the claddings 3 are integrally formed of the same kind of material, as a film-like waveguide layer 24. After the film is formed, either of the part to become the core 2 and the parts to become the claddings 3 are covered with the photomask 40 and then photoirradiation is conducted. Thereby, light is irradiated on the other, and the core 2 and the claddings 3 are formed as separate materials. Because the part to become the core 2 and the parts to become the claddings 3 are integrally formed of the same kind of material, this is advantageous in simplifying production processes.

The method of producing waveguide devices is not limited to the aforementioned production methods, and in some cases, the core 2 and the claddings 3 may be formed by combining different kinds of materials.

(9) Structure of the Core 2 and the Claddings 3

The core 2 which confines and propagates light may be of a embedded channel type as shown in FIGS. 4 and 5, or may be of a ridge type in which the core 2 locally projects outward.

EXAMPLE 1

Now, an example of the first preferred embodiment according to the first aspect of the present invention will be described.

First, a method of synthesizing variable anisotropic refractive index materials will be described, and second, a method of producing a waveguide device will be described step by step. In this example, molecular structures were confirmed by analyzing infrared absorption spectrum and H nuclear magnetic resonance spectrum. The melting point and glass transition temperature were determined by using a differential scanning calorimeter. The refractive index was obtained by measuring a mode angle when light was coupled on a waveguide layer through a coupling prism and excited a waveguide mode.

(A Method of Synthesizing a Variable Anisotropic Refractive Index Material)

7.61 g of 2-metyl-4-nitroaniline was dissolved in a mixture of 100 ml of water and 45 ml of a 36% hydrochloric acid aqueous solution, and the obtained solution was cooled to 3° C. In addition, a solution of 3.80 g of sodium nitrate in 18 ml of water was added to the above mixed solution. The solution to which sodium nitrate thus added was kept at 3° C. and stirred for one hour. Further, 9.76 g of m-tolyldiethanolamine was dissolved in a mixed solution of 125 ml of water and 7.5 ml of a 36% hydrochloric acid aqueous solution to prepare another solution. This another solution was slowly added to the aforementioned stirred solution over thirty minutes.

Figure 10:
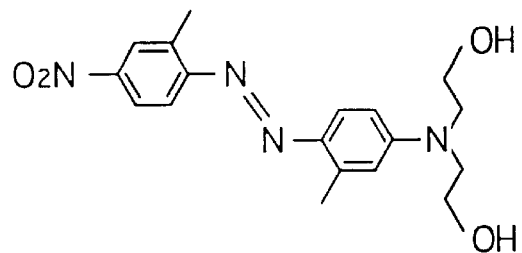
FIG. 10 shows the structural formula in a process of producing the variable anisotropic refractive index material of Example 1.

Next, the mixture was stirred for twenty minutes at 3° C., and then stirred for sixty minutes at 20° C., thereby reacting it to produce a reacted mixture. A solution of 35.4 g of potassium hydroxide in 200 ml of water was added to the reacted mixture, to neutralize it. Precipitated coarse products were filtered, rinsed with water, and dried. Recrystallization of this product from ethanol was repeated twice, thereby obtaining 4-N,N-bis(2-hydroxyethyl) amino-2,2'-dimethyl-4'-nitroazobenzene indicated by structural formula 1 in FIG. 10 (yield: 80%, melting point: 169° C.).

0.686 g of the chemical compound indicated by structural formula 1 and 0.500 g of tolylene-2,4-diisocyanate were dissolved in 10 ml of N-methyl-2-pyrrolidone and the obtained solution was stirred at 100° C. for one hour. After this solution was cooled to 20° C., 0.109 g of trans-2,5-dimethylpiperazine was added and the mixed solution was stirred for seven hours at 20° C., thereby reacting it. The reacted mixture was poured into 400 ml of a 1:1 mixture of ethanol and hexane. After that, precipitated sedimentary polymer was filtered and dried in vacuum.

Figure 11:
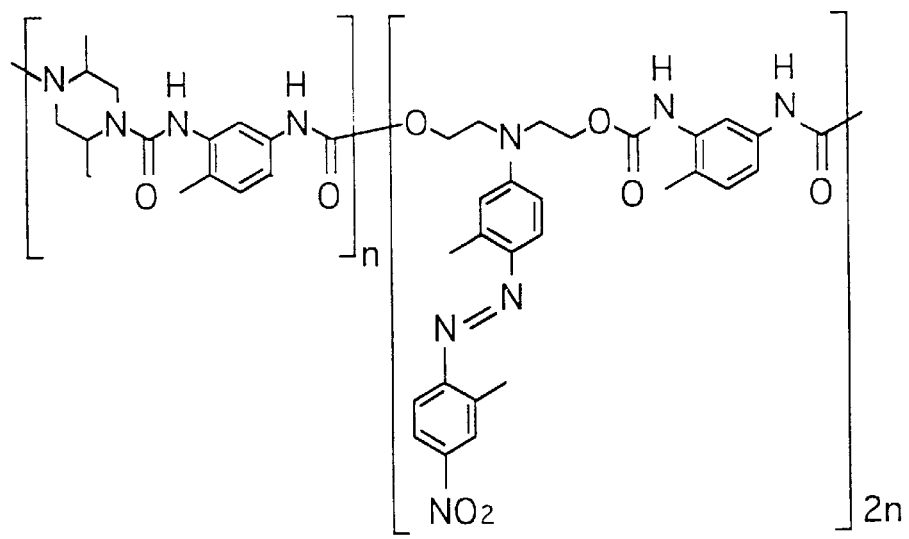
FIG. 11 shows the structural formula in further process of producing the variable anisotropic refractive index material of Example 1.

It was confirmed that this obtained polymer had structural formula 2 shown in FIG. 11 (yield: 89%, glass transition temperature: 142° C., intrinsic viscosity in N-methyl-2-pyrrolidone: 0.28 dl/g, absorption peak wavelength: 474 nm.)

Next, 1.50 g of the aforementioned chemical compound indicated by structural formula 2 in FIG. 11 and 1.571 g of 4,4'-diphenylmethane diisocyanate were dissolved in 90 ml of N-methyl-2-pyrrolidone and the obtained solution was stirred for 90 minutes at 100° C. After this solution was cooled to 20° C., a solution of 0.239 g of trans-2,5-dimethylpiperazine in 10 ml of N-methyl-2-pyrrolidone was added and then the resultant mixture was stirred. for five hours at 20° C., thereby reacting it. The reacted mixture was poured into 3000 ml of ethanol. Precipitated sedimentary polymer was filtered and dried in vacuum.

Figure 12:
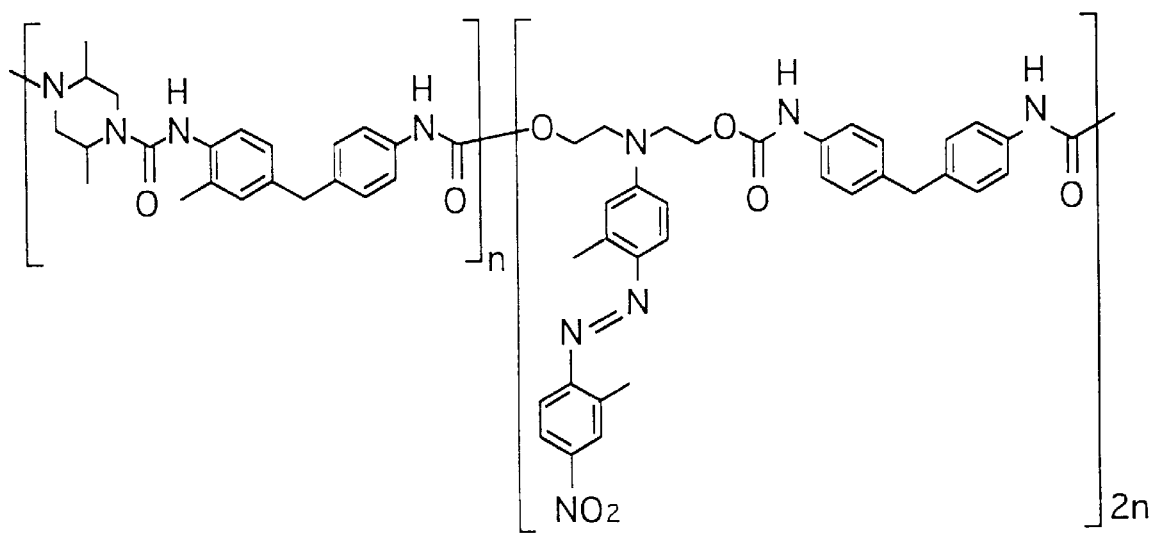
FIG. 12 shows the structural formula of the variable anisotropic refractive index material of Example 1.

It was confirmed that this obtained polymer had structural formula 3 in FIG. 12 (yield: 96%, glass transition temperature: 114° C., intrinsic viscosity in N-methyl-2-pyrrolidone: 0.80 dl/g, absorption peak wavelength: 475 nm).

(A Method of Fabricating a Waveguide Device)

In this example, a channel type waveguide device, which served as a mode filter and had a cross-sectional structure shown in FIG. 6, was produced as a specimen.

First, a 4-inch silicone wafer with a thickness of approximately 500 microns was employed as a substrate 20A. The silicone wafer was a n-type semiconductor produced by Mitsubishi Materials Co., Ltd., and had the crystallographic axis <100> and had a mirror surface on one side.

In this example, polyimide (PIQ2200 produced by Hitachi Chemical Co., Ltd.) was deposited as an undercladding 22A. In this case, the substrate 20 was subjected to a coupler (PIQ coupler produced by Hitachi Chemical Co., Ltd.) treatment beforehand. More specifically, after the coupler was spin-coated on the substrate 20A by using a photoresist spinner at a certain rotational speed, a heating treatment at 300° C. for one hour was applied to the substrate 20.

The polyimide was then spin-coated on the substrate 20A by using the photoresist spinner. The spincoating is a treatment of dropping a solution on a substrate and rotating the substrate so as to form a film on the substrate. Subsequently, the film was hardened by a heat treatment at 150° C. for one hour and 300° C. for 1.5 hours. The obtained undercladding 22A was formed of polyimide and the film thickness was 7 microns.

The variable anisotropic refractive index material synthesized above was dissolved in a solvent, pyridine, thereby forming a relatively dilute (1% by weight) pyridine solution. After filtered through a 0.2 micron-mesh Teflon (Teflon is the trademark) filter (DISMICI13P produced by ADVANTECH Toyo Co., Ltd.), the pyridine solution was concentrated by an evaporator, thereby obtaining a concentrated (6% by weight) solution. On the undercladding 22A on the substrate 20A, this concentrated solution was deposited as a waveguide layer (urethane urea copolymer) 24A, by spin-coating that solution by using the photoresist spinner. Subsequently, the obtained film was dried under vacuum at room temperature for about six hours.

The film thickness of the obtained waveguide layer 24A was about 1.3 microns. This film thickness was measured by DEKTAK II profiler produced by Sloan Technology Co., Ltd..

The waveguide layer 24A formed in this example is to constitute the core 2 and the claddings 3 upon photoirradiation. Because the part to become the core 2 and the parts to become the claddings 3 are thus integrally formed of the same material, this is advantageous in simplifying the production processes.

Light was irradiated on the waveguide layer 24A thus formed. The photoirradiation was conducted by employing a parallel rays-irradiable light source unit for an exposure apparatus (Multilight ML-251A/B produced by Ushio Electric Inc.) which used an extra-high pressure mercury lamp (USH-250BY produced by Ushio Electric Inc.) as a light source. The light irirradiated was ultraviolet rays with central wavelengths of 365 nm and 405 nm. The irradiation power was 80 mW/cm$^2$.

In irradiating light, a photomask produced by Toppan Printing Co., Ltd. was employed. This photomask was produced by forming a straight waveguide of 2 to 10 microns in width on a quartz glass by using low reflective chromium. This photomask was contacted with the part of the specimen surface to become the core 2, and the specimen was heated to a predetermined temperature (110° C.), and light was irradiated on the specimen from the above for one hour. The specimen provided with the core 2, and the claddings 3 formed on both the sides of the core 2 was thus produced.

Figure 7:
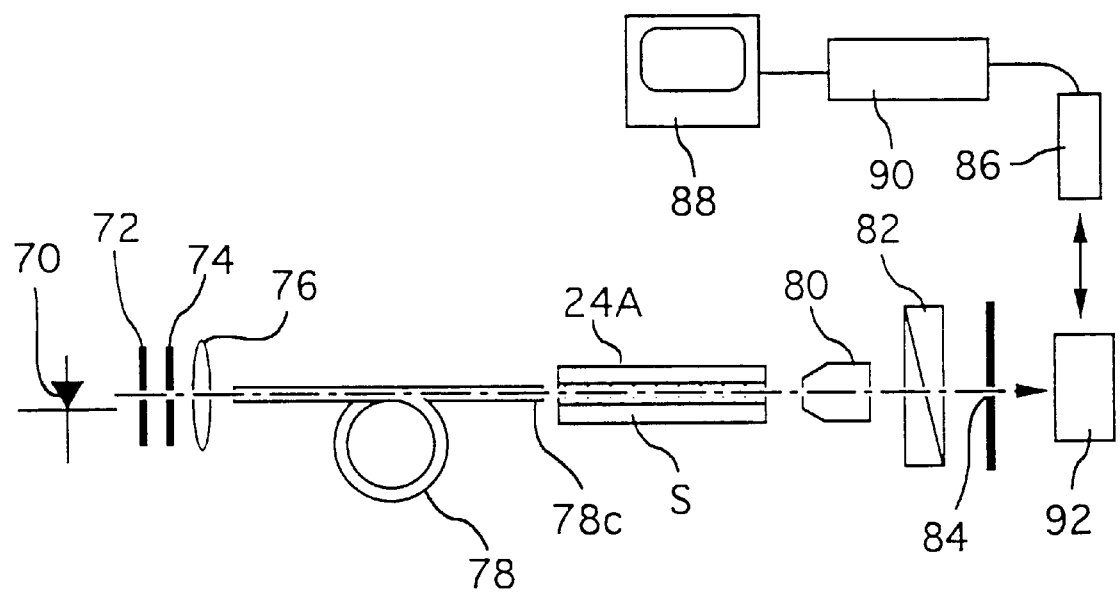
FIG. 7 illustrates a scheme of an optical system for measurement.

Near field pattern observation and output power measurement of the above specimen was carried out. An optical waveguide experiment was conducted by using an optical system shown in FIG. 7. A laser diode 70 with a wavelength of 830 nm was used as a light source, and light from the laser diode 70 passed through a π/2 wave plate 72, a ND filter 74, a lens 76, and coupled to a Lamipol fiber polarizer (Lamipol is the trade name) 78 which was an optical fiber produced by Sumitomo Osaka Cement Co., Ltd. and had a core diameter of 5 microns. Output light from the Lamipol fiber polarizer was coulpled into the core 2 of the waveguide layer 24A of the specimen S.

Owing to the adjustment by the π/2 wave plate 72 and the use of the fiber polarizer 78, the polarized light-extinction ratio of 30 dB was obtained at the output end. The adjustment of the incident light intensity was conducted by the ND filter 74 arranged between the semiconductor laser 70 and the lens 76.

In regard to the observation, on the side of an output end 78c of the fiber polarizer 78, the specimen S having the waveguide layer 24A was set on a x, y, z-axes stage with a micrometer. Axes of the fiber polarizer 78 were aligned with the core 2 of the waveguide layer 24A under the observation through a microscope.

The outgoing light from the specimen S was enlarged by an objective lens 80, and passed through a polarizer 82 and a pin hole 84, and an image was taken by a CCD camera 86, and fine adjustment was conducted under the observation on a TV monitor 88. A near field pattern analysis was conducted by using an image analyzer 90 (DVS-3000 produced by Hamamatsu Photonics Co., Ltd.).

In this example, it was confirmed by the observation of the near field pattern that a single mode waveguide was produced in the waveguide of 6 microns or less in waveguide width. Note that even when the waveguide width was more than 6 microns, a single mode waveguide could be obtained although the near field pattern was slightly deformed.

Furthermore, the optical powder was measured by a optical power meter 92 which took the place of the CCD camera 86.

In this example, when TE mode polarized light was propagated through the waveguide, light outgoing from the specimen S was still TE mode and kept an extinction ratio of 30 dB. On the other hand, when TM mode polarized light was propagated, the light could not be confined or propagated within the core 2 of the specimen S and no outgoing light was observed. The output power of the TE modes propagated through the waveguide was larger than that of the TM modes, when the TE modes and the TM modes were excited equally, the TE mode to the TE mode extinction ratio being 27 dB.

Therefore, the waveguide device constituted by this specimen S does not propagate TM mode polarized light, but serves as a TE mode filter which has a function of propagating TE mode polarized light.

(Experiments on the relation between irradiation time and refractive index, and the relation between irradiation temperature and refractive index)

In the case of employing the variable anisotropic refractive index material of this example, the relation between irradiation time and the degree of change in the refractive index was examined. In addition, the relation between the irradiation temperature and the degree of change in the refractive index was examined. In measuring refractive index, a prism coupler (PC2010 produced by Metricon Co., Ltd.) was employed, and the measurement was performed at 633 nm and 830 nm.

Figure 9:
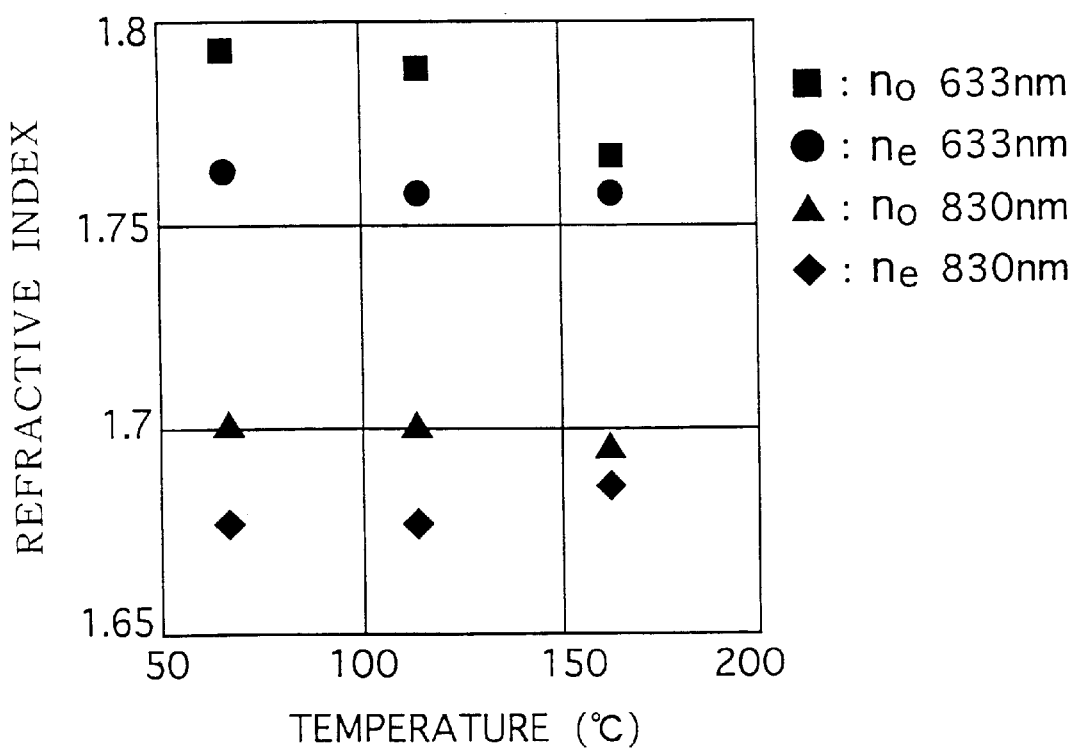
FIG. 9 is a graph showing the relation between irradiation temperature and refractive index of the variable anisotropic refractive index material of Example 1.

The results are shown in FIGS. 8 and 9. FIG. 8 shows the relation between irradiation time and refractive index when irradiation temperature was 110° C. FIG. 9 shows the relation between irradiation temperature and refractive index when irradiation time was one hour.

In FIGS. 8 and 9, the solid squares denote $n_o$ at the wavelength of 633 nm, and the solid circles denote $n_e$ at the wavelength of 633 nm. The solid triangles denote $n_o$ at the wavelength of 830 nm, and the solid diamonds denote $n_e$ at the wavelength of 830 nm.

As understood from the test results indicated by the solid squares and the solid triangles in FIG. 8, it was confirmed that ordinary refractive index $n_o$ was decreased by the photoirradiation. As understood from the test results indicated by the solid diamonds and the solid circles, it was confirmed that extraordinary refractive index $n_e$ was increased.

As apparent from FIG. 9, it was confirmed that in the variable anisotropic refractive index material of this example, the refractive index is affected by the irradiation temperature. In particular, it was confirmed that as the temperature increases, the degree of change of the refractive index is larger.

The Second Preferred Embodiment

A second preferred embodiment according to the second aspect of the present invention will be described.

In a waveguide device of this preferred embodiment, as mentioned before, other parts of the waveguide layer constitute a grating. In general, a grating is formed by using a waveguide structure placed in series with a mode filter. The grating is constituted by a refractive index modulating structure in which the refractive index of a core is periodically varied. The part in which the refractive index periodically varies can be formed by making light beam interfering and generating interference fringes. In some cases, that part may be formed in what is called a 'relief' type in which periodic convexes and concaves are formed on the surface of the light-propagating core of the waveguide layer.

Figure 13:
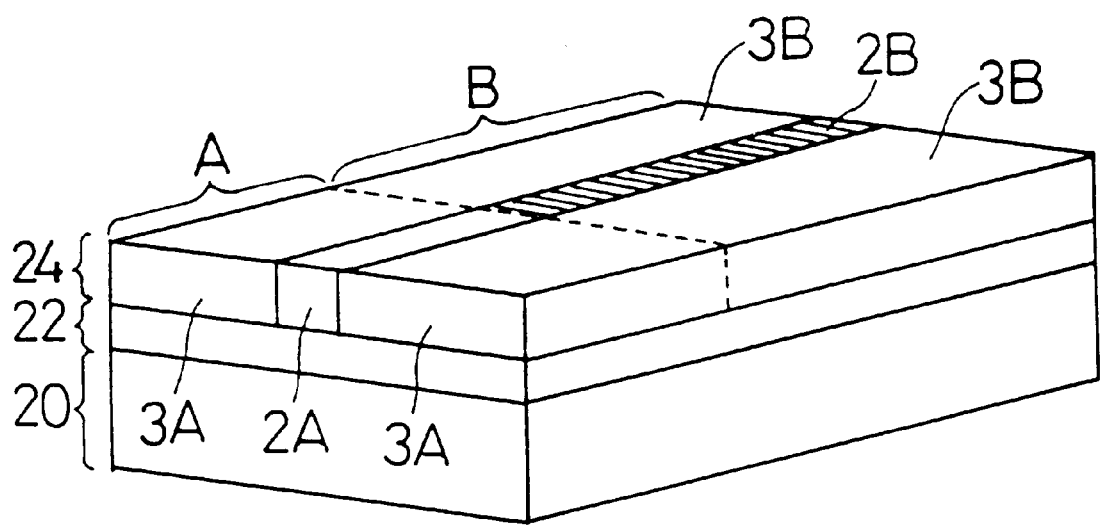
FIG. 13 is a perspective side view of a waveguide device comprising a mode filter and a grating.

The relevant parts of the second preferred embodiment are shown in FIG. 13. In this preferred embodiment, an undercladding 22 is deposited on a substrate 20, and a waveguide layer 24 is deposited on the undercladding 22. One side of the waveguide layer 24 constitutes a mode filter A and the other side of the waveguide layer 24 constitutes a grating B. The mode filter A and the grating B are series waveguide structures. In the mode filter A, the waveguide layer 24 comprises a core 2A which confines and propagates either of TE mode light and TM mode light, and claddings 3A disposed on both the sides of the core 2A. The relation between the refractive index of the core 2A and that of the claddings 3A is set to be either of the relations defined in the first aspect of the present invention.

Figure 14:
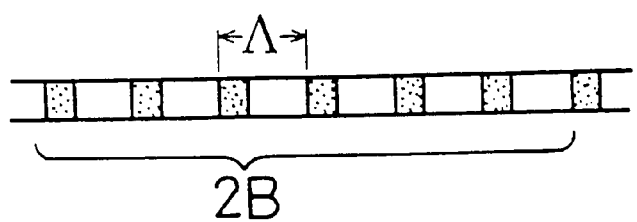
FIG. 14 is a cross-sectional view of the grating.

In the grating B, the waveguide layer 24 comprises with a core 2B which confines and propagates either of TE mode light and TM mode light in the same way as the core 2A of the mode filter A, and claddings 3B disposed on both the sides of the core 2B. In the core 2B of the grating B, a grating-shaped refractive index modulating structure is formed along its longitudinal direction. In FIG. 14, Λ denotes the period of the refractive index modulating structure.

The waveguide device of the preferred embodiment shown in FIG. 13 may be arranged with the mode filter A on the light input side and the grating B on the light output side. Or, oppositely, that waveguide device may be arranged with the grating B on the light input side and the mode filter A on the light output side.

In the preferred embodiment shown in FIG. 13, one mode filter A and one grating B are respectively formed in series waveguide structures. However, the number of mode filter A and the number of grating B can be increased, if necessary.

In the waveguide device, the core 2A of the mode filter A and the core 2B of the grating B may be of a channel type in which they are buried. Or, the core 2A and the core 2B may be of a ridge type in which they project outwardly. Depending on the situations, the waveguide device may be constituted by a cylindrical core and a cylindrical cladding in the same way as an optical fiber.

An overcladding may exist on the waveguide layer 24. In this case, the material of the overcladding may have the same refractive index as the side claddings 3A and 3B, or may have other refractive indices as long as the performance of the mode filter is not damaged.

In producing the waveguide device, the aforementioned photoirradiation for forming the mode filter A and photoirradiation for forming the grating B can be employed.

In producing the grating B, it is possible to employ a method of forming a grating-shaped refractive index modulating structure by producing interference fringes of irradiated light in the light-propagating core of the waveguide layer by a two-beam interference method, a phase grating method, or other suitable methods. Light for producing the grating B is irradiated in the wavelength range in which photoisomerization is caused, in the same way as above. In general, light in the wavelength range from the ultraviolet rays to the visible rays can be used. Preferably, a coherent laser beam can be employed.

Figure 15:
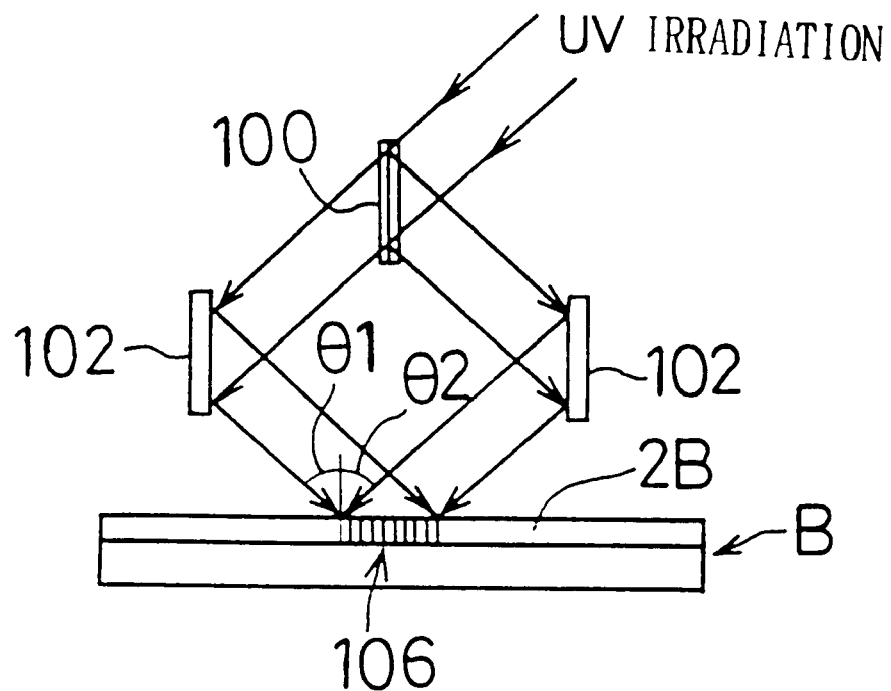
FIG. 15 is a scheme of formation of the grating by a two-beam interference method.

FIG. 15 is a scheme of formation of a grating-shaped refractive index modulating structure of the grating B by a two-beam interference method. In this case, a laser beam with wavelengths in the ultraviolet ray range is divided into two beams by a beam splitter 100, and the divided beams are reflected by mirrors 102, in such a manner that interference fringes 106 are formed in the core 2B of the grating B while incident angles θ1, θ2 with respect to the core 2B of the grating B are made equal to each other. Thereby, as shown in FIG. 14, a grating-shaped refractive index modulating part with a predetermined period Λ is formed in the core 2B of the grating B. In the two-beam interference method, the period Λ of the grating B can be controlled by adjusting the positions of the mirrors 102.

Figure 16:
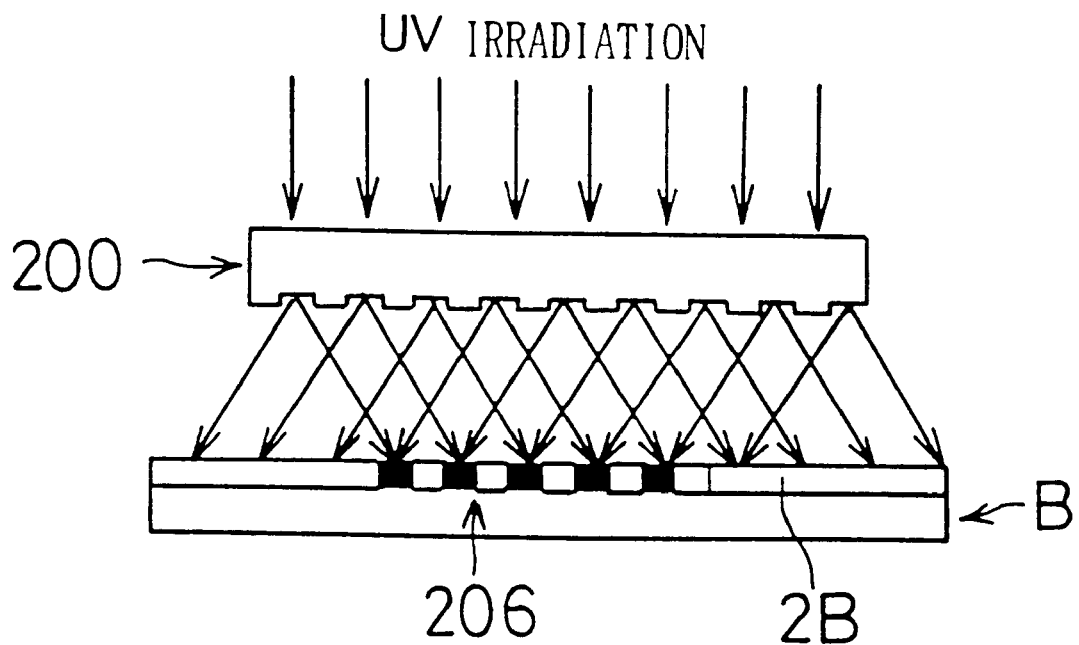
FIG. 16 is a scheme of formation of the grating by a phase grating method.

FIG. 16 is a scheme of formation of a refractive index modulating structure of the grating B by using a phase grating method. In this case, interference fringes 206 are generated in the core 2B of the grating B by employing a laser beam in the wavelength range of ultraviolet rays and using light diffracted by a phase grating 200. A grating-shaped refractive index modulating part with a predetermined period is thus formed in the core 2B. In the phase grating method, the period Λ of the grating B can be controlled by varying the pitch of the grating of the phase grating 200.

The period Λ of the grating B generally has a constant distance. Depending on the situation, the period Λ may be continuously varied. This is advantageous in attaining the function of compensating the dispersion of wavelengths or the like.

When the period Λ of the refractive index modulating part of the core 2B of the grating B is appropriately selected, light of a wavelength corresponding to the period Λ can be reflected in the core 2B, and light of other wavelengths are transmitted through the core 2B. That is to say, in FIG. 14, when rays of wavelengths $\lambda_1$, $\lambda_2$ and $\lambda_3$ are respectively launched into the waveguide device, rays of a wavelength corresponding to the period Λ are reflected and are not transmitted through the core 2B, and rays of other wavelengths transmitted through the core 2B. Therefore, the period Λ of the grating B defines the wavelength of light transmitted through the core 2B of the grating B and the wavelength of light reflected by the core 2B.

Thereby, a reflection type wavelength selectivity is provided.

Basically, the following Equation (2-1) is supposed to be fulfilled:

$$\lambda_0 = 2 \times n_{CORE} \times \Lambda \tag{2-1}$$

where Λ is the period of the refractive index modulating structure of the grating B, $\lambda_0$ is the wavelength of light reflected by the grating B, and $n_{core}$ is the refractive index of the core 2B of the grating B.

EXAMPLE 2

Now, an example of the second preferred embodiment according to the second aspect of the present invention will be described. Example 2 is an example of forming a waveguide device in which a mode filter A and a grating B are disposed in series waveguide structures as shown in FIG. 13.

The same silicone wafer as employed in Example 1 was used as a substrate 20. The silicone wafer was immersed in a mixed solution of HF and pure water at 1:50 for about one minute to clean the surface. Next, the silicone wafer was rinsed with running pure water for about five minutes, and then dried by a spindrier.

Polyimide (P1X2400 produced by Hitachi Chemical Co., Ltd.) was used as a material constituting an undercladding 22. The polyimide was spincoated on the substrate 20 and a heat treatment at 150° C. for one hour and at 300° C. for 1.5 hours was applied, thereby forming the undercladding 22.

The thickness of the polyimide layer as the undercladding 22 was about 7 microns.

In forming a waveguide layer 24, the above variable anisotropic refractive index material indicated by structural formula 3 was mixed in a solvent, pyridine, thereby forming a relatively dilute (1% by weight) pyridine solution. The pyridine solution was subjected to the same treatment as in Example 1, thereby concentrated into a concentrated solution. Then the concentrated solution was applied on the undercladding 22 by spincoating, thereby depositing the waveguide layer 24.

The spincoated material was dried under vacuum for about six hours at room temperature. The thickness of the obtained waveguide layer 24 was 1.3 microns.

Next, photoirradiation was conducted in the same way as in Example 1. Specifically, ultraviolet rays were irradiated on the waveguide layer 24 deposited on the substrate 20.

By the above ultraviolet ray irradiation, the core 2A and the claddings 3A constituting the mode filter A were formed. In this example, of the above formula (1—1) and (1-2), the relation between the ordinary and extraordinary refractive indices $n_o$ and $n_e$ of the core 2A and the claddings 3A satisfies the formula (1—1). In forming the mode filter A in this example, the above ultraviolet rays from the extra-high pressure mercury lamp were irradiated on the core 2B of the grating B besides the core 2A of the mode filter A.

Then, a grating-shaped refractive index modulating structure was printed only on the core 2B of the grating B by a two-beam interference method with employing the third harmonic wave (355 nm) of pulsed Nd: YAG laser. The mirror angles at the time of printing were adjusted so that the period (pitch) Λ of the grating B was 243 nm. In this case, the irradiation was conducted for 2 hours with keeping the specimen temperature at 80° C.

From the above Equation (2–1) $\lambda_0 = 2 \times n_{core} \times \Lambda$, when $n_{core}$ of the core 2B was 1.7, 830 nm≈2×1.7×243 nm. Therefore, theoretically light of 830 nm in wavelength was reflected by the grating B and was not transmitted through the grating B, even when it was launched into the grating B.

A light transmittance experiment was conducted by employing the specimen produced above. The mode filter A of this specimen was the one shown in FIGS. 1 and 4, and did not propagate TM mode light and propagated TE mode light. In this experiment, a laser diode of 830 nm in wavelength and a laser diode of 1.3 microns in wavelength were used as light sources. In the light transmittance experiment, basically, a laser diode, a lens, a Lamipol fiber polarizer (Lamipol is the trade name) which is an optical fiber produced by Sumitomo Osaka Cement Co., Ltd., and a waveguide device as the specimen were arranged in this order. The light from the Lamipol fiber polarizer was coupled to the mode filter A of the waveguide device, and the grating B of the waveguide device was arranged at the next part.

When light of 830 nm in wavelength was employed and coupled to the above specimen with TE mode light and TM mode light excited equally, its propagated light was not observed. In other words, light of 830 nm in wavelength was reflected by the grating B and was not transmitted through the grating B. When light of 1.3 microns in wavelength was employed and coupled to the above specimen with TE mode light and TM mode light excited equally, its propagated light was observed. In other words, light (TE mode) of 1.3 microns in wavelength was transmitted through the grating B. Therefore, it was observed that the grating B of the waveguide device of this example served as a wavelength selective filter.

The Third Preferred Embodiment

The third preferred embodiment according to the third aspect of the present invention will be described.

In this preferred embodiment, materials exhibiting refractive index anisotropy and optical nonlinearity are used.

As materials exhibiting refractive index anisotropy, the aforementioned materials can be employed. As materials exhibiting optical nonlinearity, it is possible to use π-electron conjugated systems possessing mobile electrons, or molecules having both such an electron attractive group as nitro group and cyano group, and such an electron donating group as amino group and alkoxy group. This type of molecule can exhibit relatively large optical nonlinearity. As π-electron conjugated systems, for example, benzene ring, naphthalene ring, and azobenzene ring can be used.

In order to render optical nonlinearity actually, these molecules must be oriented so as to destroy central symmetry in the molecular configuration. In order to give this molecular orientation, it is possible to employ a poling treatment of applying an electric field and orienting molecules. In this case, in order to facilitate molecular orientation, it is preferable that the poling treatment is applied with the waveguide layer heated.

The materials constituting the waveguide layer having a light modulator according to the third aspect of the invention must include molecules which can exhibit both the above function of refractive index anisotropy and the above function of optical nonlinearity. These two functions can be attained by including two kinds of molecules exhibiting individual functions, or by introducing a molecule exhibiting both the functions into one molecule.

In the case of including two kinds of molecules, there is a merit of being capable of providing a wide variety of materials by combining molecules. In the case of using the molecule exhibiting both the functions, there is a merit of being capable of introducing a large amount of optical nonlinear molecules.

In regard to the waveguide device of the third preferred embodiment, other parts of the waveguide layer constitute a light modulator in which refractive index of the core is modulated when an electric field is applied.

The waveguide layer includes a material exhibiting optical nonlinearity. Therefore, control of the refractive index can be achieved by applying an electric field to the waveguide layer. In general, electrodes are placed in the region of the waveguide layer constituting the light modulator.

Figure 17:
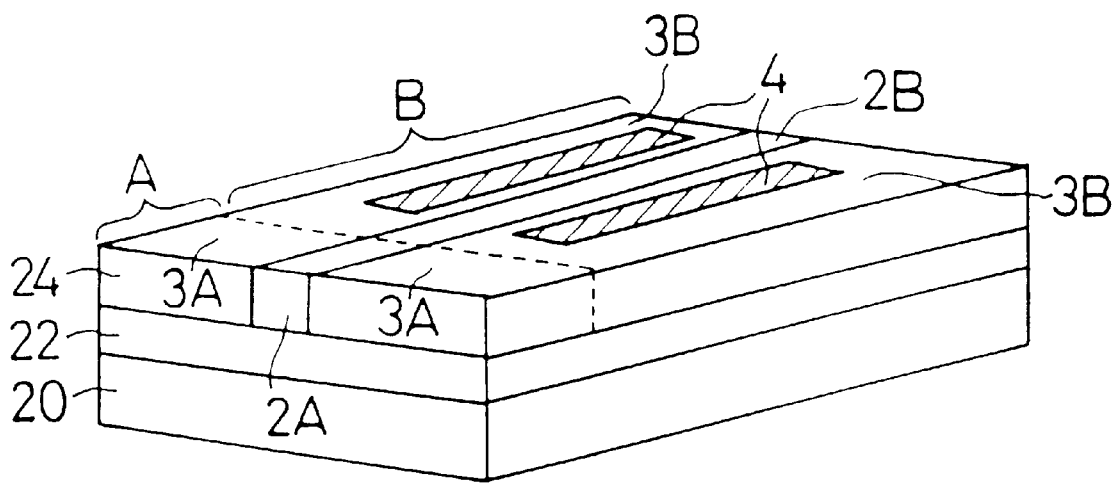
FIG. 17 is a perspective side view of a waveguide device of an instance of a third preferred embodiment comprising a mode filter and a light modulator.

The relevant parts of one instance of the third preferred embodiment are shown in FIG. 17. In this instance, an undercladding 22 is deposited on a substrate 20, and a waveguide layer 24 is deposited on the undercladding 22. One side of the waveguide layer 24 constitutes a mode filter A, and the other side of the waveguide layer 24 constitutes a light modulator B. In the mode filter A, the waveguide layer 24 comprises a core 2A which confines and propagates either of TE mode light and TM mode light, and claddings 3A arranged on both the sides of the core 2A. The relation between the refractive indices of the core 2A and the claddings 3A is set to satisfy either of the formula (1—1) and the formula (1-2).

In the light modulator B, the waveguide layer 24 comprises a core 2B which confines and transmits either of TE mode light and TM mode light, and claddings 3B arranged on both the sides of the core 2B. On the upper surface of the claddings 3B which face each other, a pair of electrodes 4 used for light modulation and formed in a thin film by vacuum evaporation or other suitable methods are placed in a manner to sandwich the core 2B. In general, a buffer layer is provided between the electrodes 4 of the waveguide layer 24 in order to exclude the influence of the electrode.

In the case of forming the light modulator B, the aforementioned part having optical nonlinearity is introduced into the material constituting the core 2B of the waveguide layer 24, and an electric field application treatment also called as a poling treatment is applied by supplying D.C. voltage to the electrodes 4. Thereby, molecular orientation is induced in the material constituting the core 2B. The core 2B whose refractive index can be controlled by the electro-optical effect can be thus produced. Otherwise, it is also possible to place electrodes, after molecular orientation is achieved by a corona poling method.

In carrying out light modulation, by supplying A.C. voltage to the electrodes 4 placed on the waveguide layer 24 to apply an external electric field to the core 2B, light modulation depending on the change in the external electric field becomes possible. Here, light modulation means an operation of replacing, through a polarizer, the change of retardation caused by the phase change of light propagating within the core 2B brought by application of an electric field, with the change of optical power. Therefore, the electrodes 4 of this preferred embodiment serve both the function of electric field application in a poling treatment and the function of electric field application in light modulation. The light modulation. The term 'light modulation' used in the present invention is not limited to intensity modulation and includes phase modulation.

Figure 18:
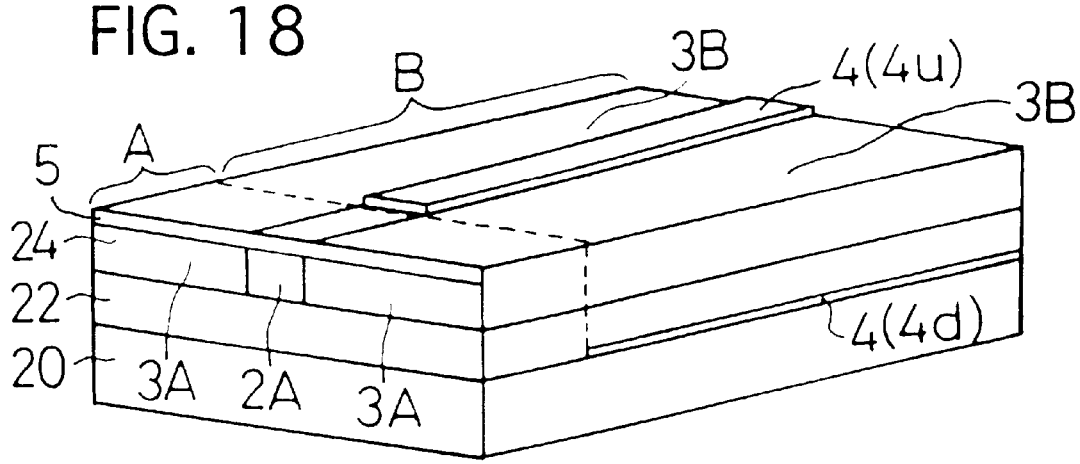
FIG. 18 is a perspective side view of a waveguide device of another instance of the third preferred embodiment comprising a mode filter and a light modulator.
Figure 19A:
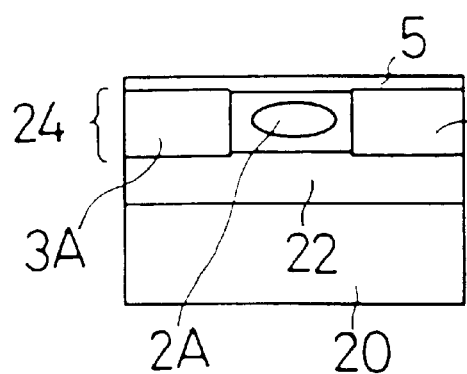
FIG. 19(A) is a cross sectional view of the mode filter of the waveguide device shown in FIG. 18.
Figure 19B:
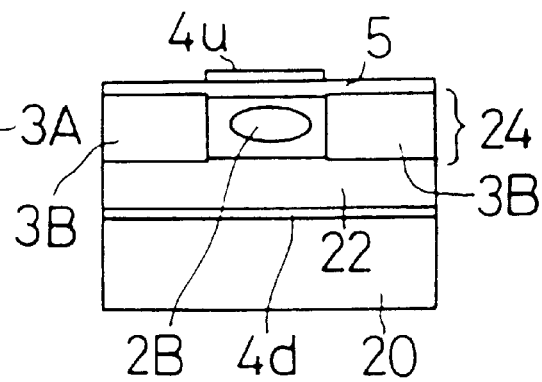
FIG. 19(B) is a cross sectional view of the light modulator of the waveguide device shown in FIG. 18.

The relevant parts of another instance of the third preferred embodiment are shown in FIGS. 18, 19(A), and 19(B). Also in this instance, an undercladding 22 and a waveguide layer 24 are deposited in this order on a substrate 20. Also in this instance, one side of the waveguide layer 24 constitutes a mode filter A and the other side of the waveguide layer 4 constitutes a light modulator B. FIG. 19(A) shows a cross section of the mode filter A and FIG. 19(B) shows a cross section of the light modulator B. In the mode filter A, the one side of the waveguide layer 24 comprises a core 2A and claddings 3A arranged on both the sides of the core 2A. The relation between the refractive indices of the core 2A and the claddings 3A is set to satisfy either of the formula (1—1) and the formula (1-2). As shown in FIG. 19(B), in the light modulator B, the other side of the waveguide layer 24 comprises a core 2B and claddings 3B arranged on both the sides of the core 2B. A lower electrode 4 (4d) formed by vacuum evaporation or other suitable methods is placed between the substrate 20 and the undercladding 22. An upper electrode 4u formed by vacuum evaporation or other suitable methods is placed on the core 2B so as to face the lower electrode 4d. A buffer layer 5 is provided between the upper electrode 4u and the waveguide layer 24.

In carrying out light modulation, A.C. voltage is supplied to the electrodes 4 (4d, 4u) to apply an external electric field to the core 2B. Thus, light modulation depending on the change in the external electric field becomes possible. Because of the production processes, a lower electrode might be formed between the substrate 20 and the undercladding 22 of the mode filter A.

The waveguide device of the instance shown in FIG. 17 may be used by placing the mode filter A on the light input side and the light modulator B on the light output side. Oppositely, this device may be used by placing the light modulator B on the light input side and the mode filter A on the light output side. The waveguide device of the instance shown in FIG. 18 can also be used in both the configurations.

In the instance shown in FIG. 17 and the instance shown in FIG. 18, one mode filter A and one light modulator B are provided in series arrangement. However, the number of mode filter A and the number of light modulator B can be increased, if necessary.

In producing the above waveguide device of the third preferred embodiment, it is possible to employ a photoirradiation treatment for producing a mode filter and a poling treatment for carrying out molecular orientation for light modulation.

The photoirradiation treatment for producing the mode filter can be applied in the same way as above, and necessary optical power and irradiation time to cause a desired refractive index change are appropriately selected. When light is irradiated at the elevated temperature in order to shorten processing time, the efficiency of varying the refractive index is enhanced.

In order to render optical nonlinearity, an operation of orienting molecules by applying a D.C. electric field to a material constituting the waveguide layer is carried out as a poling treatment. The poling treatment may be corona poling by using a needle electrode or may be poling by using parallel plate electrodes. In general, optical nonlinearity increases as the degree of molecular orientation increases. Therefore, in order to orient molecules more easily, the treatment is applied with the material constituting the waveguide layer heated. Although it depends on the kind of material, it is generally preferable that heating temperature is above the glass transition temperature of the material.

Figure 20:
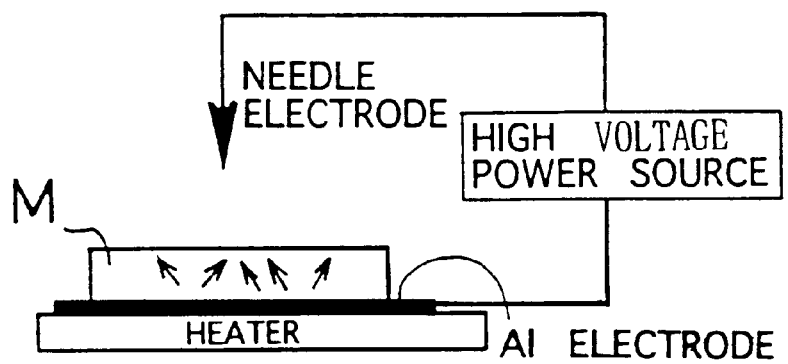
FIG. 20 shows a scheme of a corona poling treatment using a needle electrode.
Figure 21:
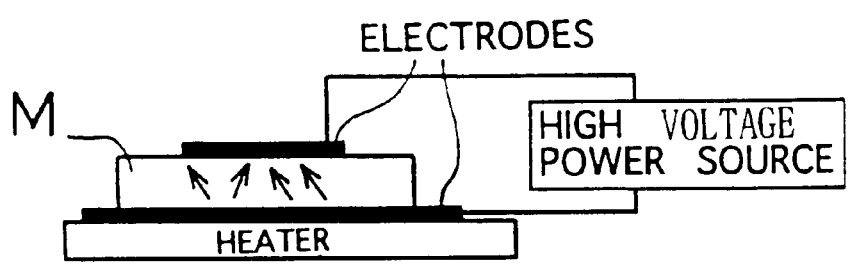
FIG. 21 shows a scheme of a poling treatment using parallel plate electrodes.
Figure 22:
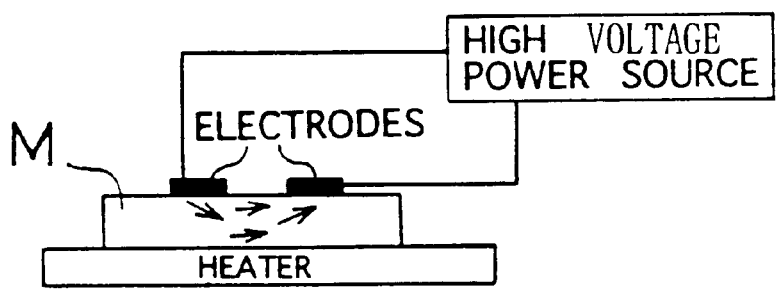
FIG. 22 shows a scheme of a poling treatment using other plate electrodes.

The schemes of poling treatments are shown in FIGS. 20 to 22. FIG. 20 illustrates the scheme of corona poling. In this case, an electrode arranged below a waveguide layer M and a needle electrode arranged above the waveguide layer M are employed, and both the electrodes are connected to a high voltage D.C. power source, whereby an electric field is applied to the waveguide layer M. FIG. 21 illustrates the scheme of poling employing parallel plate electrodes. In this case, one electrode arranged below a waveguide layer M and one electrode arranged above the waveguide layer M are employed, and both the electrodes are similarly connected to a high voltage D.C. power source, whereby an electric field is applied to the waveguide layer M.

FIG. 22 illustrates the schematic of poling employing two plate electrodes. In this case, two electrodes arranged above a waveguide layer M are employed, and both the electrodes are similarly connected to a high voltage D.C. power source, whereby an electric field is applied to the waveguide layer M. When each of these poling treatments is applied to the waveguide layer M, molecules within the waveguide layer M become oriented, and attain optical nonlinearity and an electro-optical effect. The direction of molecular orientation in the instance in FIG. 22 is perpendicular to those in the instances shown in FIGS. 20 and 21. As a poling method, it is also possible to employ a method of applying an electric field while irradiating light, or a method of irradiating polarized light.

As procedures of the production method of the third preferred embodiment, it is possible to employ a method comprising applying photoirradiation treatment first and then applying poling treatment, or a method of doing them in reverse order. In the former method, first, a waveguide structure having a mode filter function is formed by photoirradiation treatment, and then poling treatment is applied only to a part of the waveguide structure which is to constitute a light modulator. In this case, it is preferable to apply poling treatment in such a manner that an electric field caused by the poling treatment is not applied to the part of the waveguide which is to serve as a mode filter.

In the latter method, poling treatment is applied only to a part of the waveguide structure which is to constitute a light modulator. In this case, it is preferable to apply poling treatment in such a manner that an electric field caused by the poling treatment is not applied to the part of the waveguide which is to serve as a mode filter. After that, a part of the waveguide which is to serve as a mode filter is formed by applying photoirradiation treatment with using a photomask.

EXAMPLE 3

Hereinafter, an example of the third preferred embodiment according to the third aspect of the present invention will be described with reference to FIGS. 18, 19(A), and 19(B). The same silicone wafer as used in Example 1 was used as a substrate 20. The silicone wafer was immersed for about one minute in a solution of HF and pure water mixed at the ratio of 1:50, so as to clean the surface. Next, the wafer was rinsed with running pure water for about five minutes and dried by a spindrier, and then subjected to an electrode forming step by vacuum evaporation.

In the electrode forming step by vacuum evaporation, first 100 angstrom of chromium (Cr) and then 2000 angstrom of aluminum (Al) were vacuum-evaporated on the silicone wafer by using an EB vacuum evaporation apparatus (EVD-500B produced by Aneruba Co., Ltd.), whereby a lower electrode 4d was formed. At this time, a photomask was placed on a part of the silicone was not formed on that part.

Next, polyimide was directly spincoated on the electrode 4d, and a thermal treatment at 150° C. for one hour and at 300° C. for 1.5 hours was applied, thereby forming an undercladding 22. The thickness of the polyimide layer as the undercladding 22 was approximately 7 microns.

In producing a waveguide layer 24, the variable anisotropic refractive index material produced above was mixed in pyridine in the same way as in Example 1, thereby forming a relatively dilute pyridine solution. This pyridine solution was filtered through a Teflon (Teflon is the trademark) filter and concentrated, thereby forming a concentrated solution. Then, this concentrated solution was deposited on the undercladding 22 by spincoating.

After spincoating, this specimen was dried under vacuum for about six hours at room temperature. The thickness of the obtained waveguide layer 24 was 1.3 microns.

Then, photoirradiation was conducted. Specifically speaking, ultraviolet rays were irradiated on the waveguide layer 24 on the substrate 20 in the same way as in Example 1.

The core 2A and the claddings 3A constituting a mode filter A were formed by the ultraviolet ray irradiation. Of the above formula (1—1) and formula (1-2), the relation between the refractive indices of the core 2A and the claddings 3A was set to satisfy the formula (1—1).

After that, a fluorine-contained polymer solution (CYTOP-805A produced by Asahi Glass Co., Ltd.) for spincoating was spincoated on the waveguide layer 24 by a photoresist spinner at a rotational speed of 1000 rpm, thereby depositing a protective coating. Then, it was dried under vacuum at 80° C. for one hour. The thickness of the protective coating layer was 0.65 microns.

Next, polymethylmethacrylate (PMMA) purified by using precipitation to methanol from acetone solution was employed as an overcladding 5 which covered the part above the waveguide layer 24. Specifically speaking, a 5 wt. % PMMA chloroform solution was prepared and spincoated on the specimen with the protective coating by using a photoresist spinner (K-3359SD-1 produced by Kyowa Riken Co., Ltd.) at a rotational speed of 1000 rpm. Then, it was dried in vacuum at room temperature for two hours. The thickness of the overcladding 5 was 1.5 microns.

Next, the whole specimen was immersed in liquid nitrogen and cooled. Then the specimen including the waveguide layer 24 was cleaved along <010> and <001> directions of the crystal planes, in which directions the specimen had been scratched beforehand, and the end surfaces were exposed.

On PMMA layer of the above specimen, about 2000 angstrom of aluminum was vacuum-evaporated by using a vacuum evaporation apparatus (VPC-410 produced by Shinku Kiko Co., Ltd.), thereby forming an upper electrode 4u. In this case, the electrode was vacuum-evaporated only on a desired part, with the specimen covered with a cover glass. After the lower electrode 4d was bared, lead wires were respectively connected to the upper electrode 4u and the lower electrode 4d by using silver paste.

Next, while the specimen was heated to a target temperature of 170° C., an electric field was applied through the upper electrode 4u and the lower electrode 4d, whereby optical nonlinearity was rendered to a part of the waveguide layer 24 which was to constitute a light modulator B.

In the waveguide device of this example, the refractive index anisotropy in the waveguide layer 24 can be controlled. Therefore, when compared with the case where anisotropic crystals were employed, freedom of design can be secured. In addition, the cost of this material is lower than those of anisotropic crystals. Further, the waveguide device of this example has additional advantages in which the constitution is simple, production processes are fewer, and production costs are reduced.

A light modulation experiment was conducted by using the specimen produced in Example 3. In this case, a laser diode with a wavelength of 830 nm was employed as a light source. Basically, a laser diode, a lens, a Lamipol fiber polarizer (Lamipol is the trademark) which is an optical fiber produced by Sumitomo Osaka Cement Co., Ltd., and the waveguide device were placed in this order. The light from the Lamipol fiber polarizer was coupled to the light modulator B of the waveguide device, and the mode filter A of the waveguide device was placed at the next part.

In the light modulation experiment, the TE mode and the TM mode were excited equally and launched. The optical power from the output end of the Lamipol fiber polarizer (produced by Sumitomo Osaka Cement Co., Ltd.) was adjusted such that the intensity in the vertical direction (corresponding to TM mode) was equal to the intensity in the horizontal direction (corresponding to TE mode), and the light from the polarizer was coupled to the input part of the waveguide of the waveguide device.

High frequency A.C. voltage was applied between the lower electrode 4d and the upper electrode 4u of the specimen.

When frequency of the A.C. power was 1 KHz, modulation of optical power was confirmed. This modulation of power was induced by the change in retardation of the light modulator part of the specimen, and the waveguide mode selection of the mode filter part of the specimen.

The Fourth Preferred Embodiment

Figure 23:
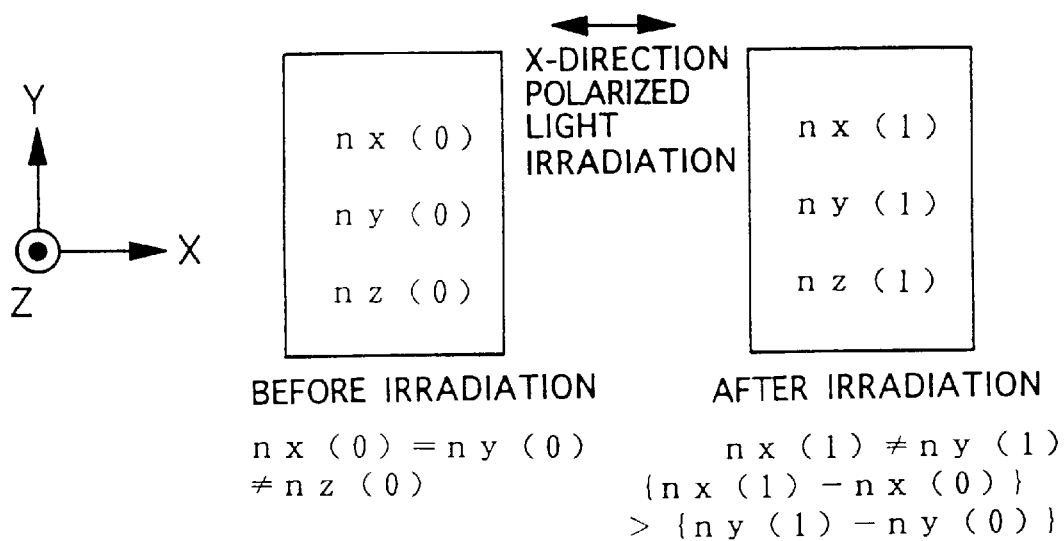
FIGS. 23(A) to 23(C) show schemes of change of three-dimensional (principal) refractive indices $n_x$, $n_y$, $n_z$ by photoirradiation.
FIG. 23(D) shows a relation X, Y, Z-axes concerning a core and a clad.

The fourth preferred embodiment according to the fourth aspect of the present invention will be described. The waveguide structure of the fourth preferred embodiment is generally formed by using the above variable three-dimensional refractive index materials. In FIG. 23(A), the planer direction of the waveguide structure is defined as X and Y, and a direction perpendicular to the plane is defined as Z. FIG. 23(B) shows the relation between the refractive indices of the waveguide structure before photoirradiation. The refractive indices in the planer direction before photoirradiation are defined as $n_x(0)$, $n_y(0)$, and the refractive index in the direction perpendicular to the plane is defined as $n_z(0)$. (0) means 'before photoirradiation'. Before photoirradiation, the variable three dimensional refractive index of material is defined such that $n_x(0)=n_y(0)\neq n_z(0)$.

In this preferred embodiment, $n_x$ and $n_y$ correspond to ordinary refractive index $n_o$ ($n_o=n_x$, $n_y$). $n_z$ corresponds to extraordinary refractive index $n_e$ ($n_e=n_z$)

FIG. 23(C) shows the relation between the refractive indices after photoirradiation. The refractive indices in the planer direction of the waveguide structure after photoirradiation are defined as $n_x(1)$, $n_y(1)$, and the refractive index in the direction perpendicular to the plane is defined as $n_z(1)$. (1) means 'after photoirradiation'.

When light irradiated on a film which is to constitute the waveguide structure is X-direction polarized light, in regard to $n_x$ which is the refractive index in a direction corresponding to the field direction of the polarized light, the amount of decrease in $n_x(1)$ after photoirradiation is large. It is assumed molecules facing the X-direction tend to be reacted strongly by ansotropic absorbance of molecules.

In contrast, in regard to $n_y$ which is the refractive index in a direction not corresponding to the field direction of the X-direction polarized light, the amount of decrease in $n_y(1)$ after photoirradiation is small. This is assumed to be the result of the fact that owing to the absorption anisotropy of molecules, photoisomerization reaction sometimes shows directional dependency when polarized light is irradiated. When compared with $n_z(0)$ before photoirradiation, $n_z(1)$ after photoirradiation is increased.

As a result, the following formula (4-1) and (4-2) are obtained.

$$n_x(1) \text{ does not equal } n_y(1) \tag{4-1}$$

$$(n_x(0)-n_x(1))>(n_y(0)-n_y(1)) \tag{4-2}$$

Here, the formula (4-1) means that planer refractive indices $n_x(1)$, $n_y(1)$ become different from each other after photoirradiation. The formula (4-2) means that since X-direction polarized light is irradiated, the difference in refractive index $n_x$ caused by photoirradiation is larger than the difference in refractive index $n_y$ caused by photoirradiation. This means that when X-direction polarized light is irradiated, planer refractive index $n_x$ is decreased more than planer refractive index $n_y$.

As mentioned above, the above variable three-dimensional refractive index materials are materials wherein anisotropic refractive indices ($n_z \neq n_x = n_y$) are shown before photoirradiation, and three-dimensional refractive indices are varied after polarized light is irradiated, and the variation in refractive index $n_z$ caused by the photoirradiation is an increase and the variations in refractive indices $n_x$ and $n_y$ caused by photoirradiation are decreases by the amounts dependent on the field direction of the polarized light.

As these variable three-dimensional refractive index materials, it is possible to employ materials whose molecular structure is changed by photoirradiation. In addition, because it is necessary to cause a structural change dependent on the field direction of the polarized the light, the variable three-dimensional refractive index materials must have absorption anisotropy with respect to irradiated polarized light.

Examples of these materials include chemical compounds including trans-cis photoisomerizable carbon—carbon double bond or azo group. In order to cause a desired change in refractive index, it is important to employ molecules which have a large anisotropic refractive index change, and it is preferable to use azobenzene derivatives or stilbene derivatives. A larger anisotropic change can be obtained by introducing such a functional group as alkyl group, carboxyl group, nitro group, cyano group, amino group, and methoxyl group to these derivatives. A much larger refractive index anisotropic change can be obtained by introducing such an electron attractive group as nitro group and cyano group, and such an electron donating group as amino group and methoxyl group at both the ends of each molecule.

In order that the variable three-dimensional refractive index materials show anisotropic refractive index before polarized light is irradiated, molecules must be oriented in a plane by applying a spincoating process, a melting extrusion molding process, or other suitable processes to the above materials. The degree of anisotropy can be controlled by adjusting viscosity of materials, rotational speed in the spincoating process, and the drawing ratio in molding.

The waveguide device of the fourth preferred embodiment can constitute a mode filter which selectively transmits either of TE mode light and TM mode light.

In producing the waveguide device of the fourth preferred embodiment, polarized light to be irradiated is in a wavelength range in which photoisomerization is caused. In general, polarized light to be irradiated is in the wavelength range from the ultraviolet rays to the visible rays, and can be each of a laser beam and a non-laser beam. As a light source for photoirradiation, a high pressure mercury lamp is generally employed, but in some cases, an excimer laser or other suitable light sources can be employed.

When a light source which emits desired polarized light can be prepared, the light can be irradiated as it is. When such a light source cannot be prepared, light can be irradiated through a polarizer.

EXAMPLE 4

Hereinafter, an example of the fourth preferred embodiment according to the fourth aspect of the present invention will be described.

Figure 24:
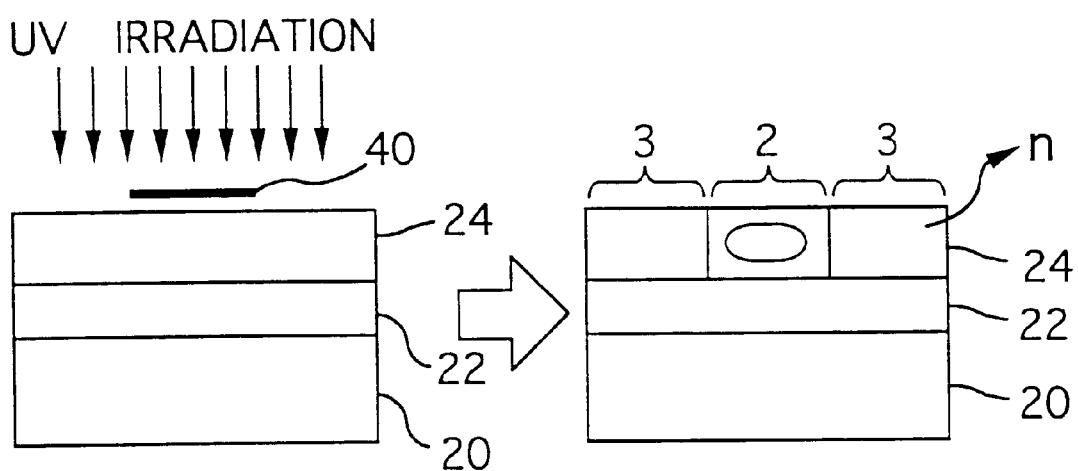
FIG. 24 is a schematic diagram of production processes of a waveguide device of Example 4.

The scheme of a method of producing the waveguide device of this example is illustrated in FIG. 24. The waveguide device of this example is a mode filter which propagates TE mode and irradiates TM mode. As a substrate 20, the same material as used in Example 1 was used.

The substrate 20 was immersed for about one minute in a solution of HF and pure water mixed at the ratio of 1:50 to clean the surface. Next, the substrate 20 was rinsed with running pure water for about 5 minutes, and then dried by a spindrier.

Then, polyimide (PIX2400 produced by Hitachi Chemical Co., was used as a material constituting an undercladding 22. The polyimide was spincoated on the substrate 20 and a thermal treatment at 150° C. for one hour and at 300° C. for 1.5 hours was applied, thereby forming the undercladding 22.

The thickness of the polyimide layer as the undercladding 2 was about 7 microns.

In constituting a waveguide layer 24, the variable three-dimensional refractive index material synthesized above was mixed in pyridine in the same way as in Example 1, thereby forming a relatively dilute pyridine solution. After filtered through a Teflon (Teflon is the trademark) filter, this pyridine solution was concentrated into a concentrated solution. Then, this concentrated solution was applied on the undercladding 22 by spincoating, thereby depositing the waveguide layer 24. The waveguide layer 24 had the refractive index relation ($n_x(0)=n_y(0) \ne n_z(0)$) shown in FIG. 23(B).

After the above spincoating, the specimen was dried under vacuum for six hours at room temperature. The thickness of the obtained waveguide layer 24 was 1.3 microns.

Figure 25:
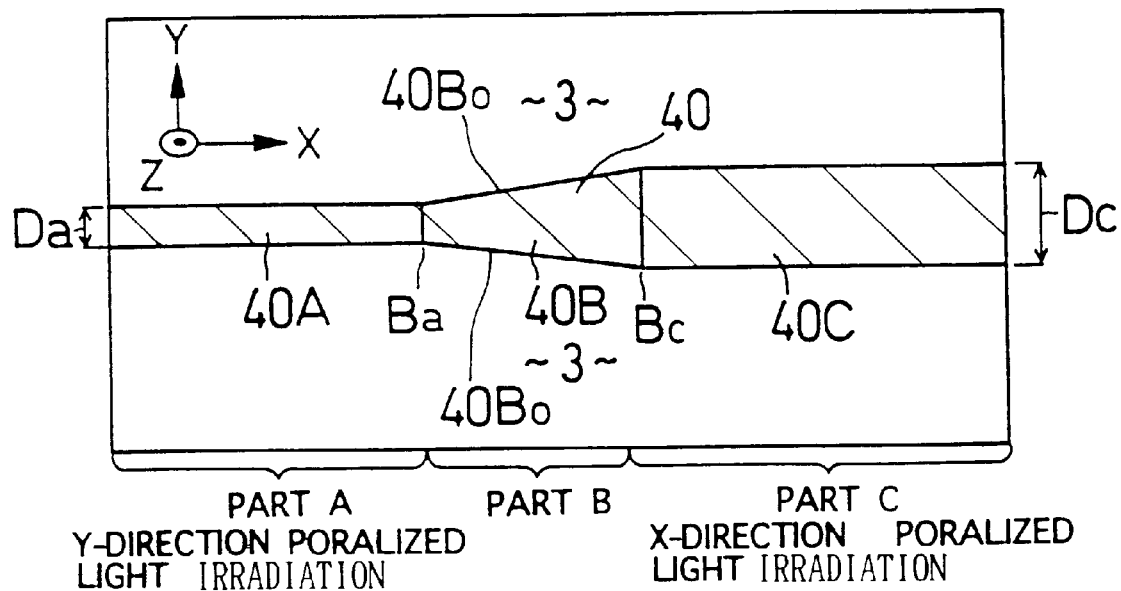
FIG. 25 schematically shows a production process of Example 4.

Then, photoirradiation was conducted. Specifically speaking, ultraviolet rays were irradiated on the waveguide layer 24 on the substrate. In irradiating light, a polarizer for producing polarized light was placed between the surface of the waveguide layer 24 and a light source. In addition, as understood from FIG. 24, a photomask 40 for shading was placed on a part (the shaded area in FIG. 25) which corresponded to the core 2 and was to constitute a waveguide, and light was irradiated on the photomask 40. As understood from FIG. 25, the photomask 40 comprised a narrow mask portion 40A with a width of Da, a mask portion 40B with inclined sides $40B_o$, and a wide mask portion 40C with a width of Dc.

Figure 26:
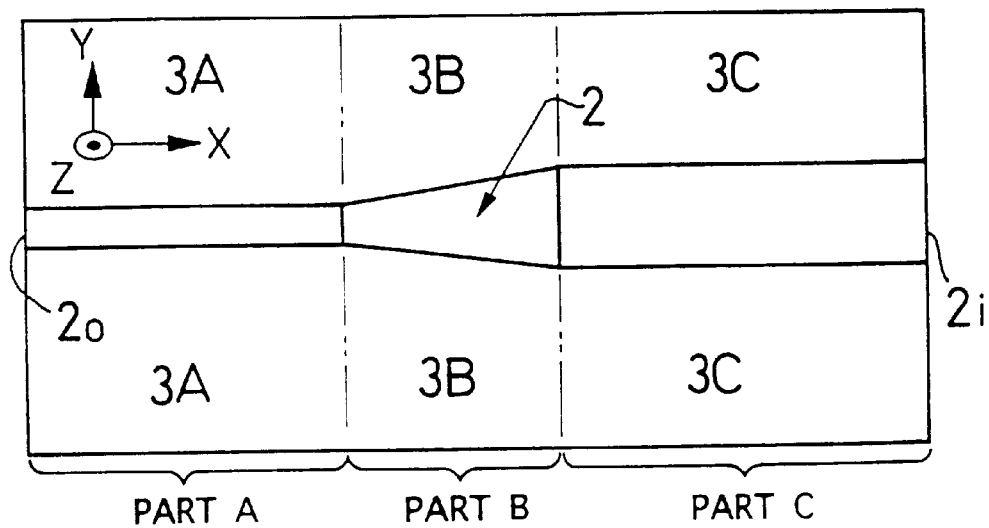
FIG. 26 is a plan view of the waveguide device of Example 4.

Hereinafter, the state of photoirradiation will be described in detail. As seen from FIG. 26, the waveguide device of this example was roughly divided into a part A having claddings 3A, a part B having claddings 3B, and a part C having claddings 3C. Referring to FIG. 26, in the part A, with the photomask 40 placed as described above, Y-direction polarized light (i.e., polarized light which has the Y-direction field) was irradiated on parts corresponding to the claddings 3A, thereby forming the claddings 3A. In the case of forming the claddings 3A, the parts corresponding to the claddings 3B and 3C were covered with another photomask.

In the meanwhile, in the part C, with the photomask 40 placed as mentioned above, X-direction polarized light (i.e., polarized light which has the X-direction field) was irradiated on the parts corresponding to the claddings 3C, thereby forming the claddings 3C. In the case of forming the claddings 3C, the parts corresponding to the claddings 3A and 3B were covered with another photomask.

In the part B, with the photomask 40 placed as mentioned above, light was irradiated on the parts corresponding to the claddings 3B, thereby forming the claddings 3B. In this case, the polarization angle of a polarizer placed above the photomask 40 was gradually varied little by little so as to control light such that the ratio of X-direction polarized light was increased in a part Bc of the part B near the part C and the ratio of Y-direction polarized light was increased in a part Ba of the part B near the part A. More concretely, this control was conducted by irradiating light through slits. In the case of forming the claddings 3B of the part B, the parts corresponding to the claddings 3A of the part A and the claddings 3C of the part C were covered with another photomask.

By the above photoirradiation, the waveguide structure shown in FIG. 26, i.e., a mode filter was obtained which comprised the core 2 (the shaded area in FIG. 25) which was a waveguide extending straight from a light input end $2_i$ to a light output end $2_o$, and the claddings 3 (3A, 3B, 3C) sandwiching the core 2.

With regard to the waveguide structure shown in FIG. 26, because the claddings 3A of the part A were irradiated by Y-direction polarized light, the planer refractive index $n_x(1)$ of the claddings 3A was decreased slightly but the planer refractive index $n_y(1)$ of the claddings 3A was decreased largely. Therefore, in the claddings 3A of the part A, the refractive index difference ($n_y(0)-n_y(1)$) became relatively large, and the ability of confining light was strengthened, and as a result, the width of the waveguide became small in order to satisfy the condition of single mode waveguide.

On the other hand, because the claddings 3C of the part C were irradiated by X-direction polarized light, the planer refractive index $n_y(1)$ of the claddings 3C was slightly decreased, but the planer refractive index $n_x(1)$ of the claddings 3C was largely decreased. Therefore, in the cladding 3C of the part C, the refractive index difference ($n_y(0)-n_y(1)$) became relatively small, and the ability of confining light was weakened, and as a result, the width of the waveguide became large in order to satisfy the condition of single mode waveguide.

In the claddings 3B of the part B, the refractive indices $n_x$, $n_y$ were continuously varied from the part $B_c$ to the part $B_a$.

The claddings 3A, 3B, 3C of the parts A, B, C also serve as a mode filter which propagates TE mode signal light but irradiates TM mode signal light, because the perpendicularto-the-plane refractive index $n_z(1)$ was increased. This is because $n_z$ corresponded to the extraordinary refractive index $n_e$.

In summary, in this example, a mode filter of single mode waveguide having different mode field widths can be produced. That is to say, this type of waveguide device can be arranged with the part having a large waveguide width on the input end $2_i$ side into which signal light is launched, and the part A having a small waveguide width on the output end $2_o$ from which signal light is outgoing. Therefore, in the case of coupling the waveguide device of this example to an optical fiber, this is advantageous in improving coupling efficiency and decreasing total coupling loss in the waveguide device.

When Y-direction polarized light was irradiated, the degree of refractive index change was measured. A prism coupler (PC2010 produced by Metricon Co., Ltd.) was employed, and light with a wavelength of 633 nm was used as signal light to be propagated. Then, refractive indices $n_x(0)$, $n_y(0)$, $n_z(0)$ before photoirradiation, and refractive indices $n_x(1)$, $n_y(1)$, $n_z(1)$ after photoirradiation were measured. The results of measurement are shown in Table 1. As seen from Table 1, the decrease in the planer refractive index $n_x$ which was a refractive index in a direction not corresponding to the field direction of Y-direction polarized light was small, but the decrease in the planer refractive index $n_y$ which was a refractive index in a direction corresponding to the field direction of Y-direction polarized light was large.

TABLE 1

| REFRACTIVE INDEX | BEFORE IRRADIATION(0) | AFTER IRRADIATION(1) |
| --- | --- | --- |
| $n_x$ | 1.796 | 1.7958 |
| $n_y$ | 1.796 | 1.792 |
| $n_z$ | 1.757 | 1.761 |

ANOTHER EXAMPLE

Figure 27:
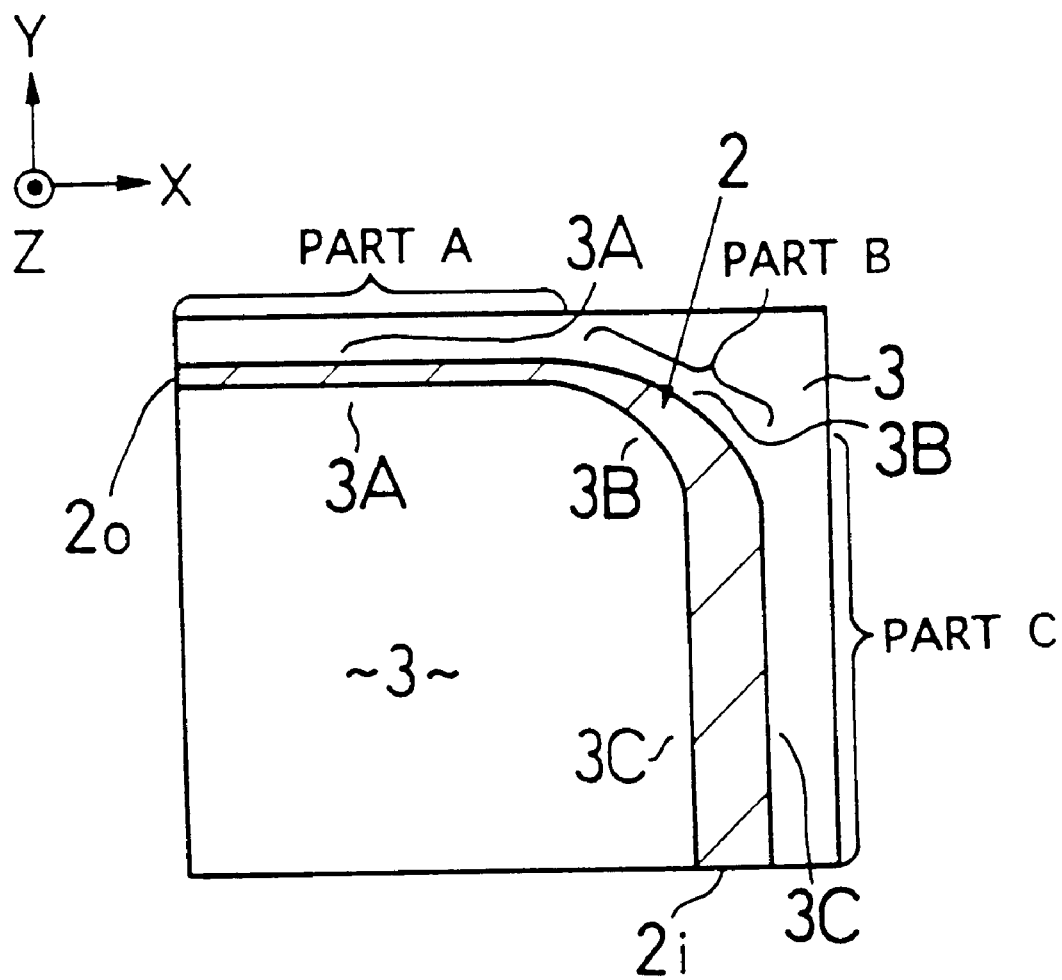
FIG. 27 is a plan view of a waveguide device of another example.

FIG. 27 shows another example. The example shown in FIG. 27 has a core 2 which is a bent waveguide. This example has basically the same construction as the above Example 4. Same numerals or characters denote parts having the same functions. The shaded area in FIG. 27 indicates the core 2 through which signal light is propagated, and the blank areas indicate the claddings 3 sandwiching the core 2. The waveguide device of this example can also be roughly divided into a part C on the light input end $2_i$ having a waveguide with a large width, a part A on the light output end $2_o$ having a waveguide with a small width, and an intermediate part B between the part C and the part A.

In a production step of this example, a photomask for light shading is placed on a part to become the core 2 (the shaded area). With the photomask placed, Y-direction polarized light is irradiated on claddings 3A of the part A and claddings 3C of the part C, thereby forming the claddings 3A and 3C. At this time, claddings 3B of the part B are covered with another photomask for shading.

In another production step, light is irradiated while the polarization angle of a polarizer arranged above the photomask is continuously varied little by little, thereby forming the claddings 3B. In the case of forming the claddings 3B, the parts corresponding to the claddings 3A, 3C are shaded with another photomask. More concretely, the adjustment was made by irradiating light through slits.

In the fourth preferred embodiment, the input end side into which light is launched can be a part having a large waveguide width, and the output end side from which light is outgoing can be a part having a small waveguide width. Therefore, in coupling the waveguide device according to the present invention to an optical fiber, this constitution is advantageous in improving coupling efficiency and decreasing total coupling loss.

Obviously, many modifications and variations of the present invention are possible in the light of the above teachings. It is therefore to be understood that within the scope of the appended claims, the invention may be practiced otherwise than as specifically described.

What is claimed is:

1. A waveguide device having a waveguide layer, said waveguide layer comprising:

a core of a material with a variable anisotropic refractive index or the same material dispersed in a matrix, said core having an ordinary refractive index ($n_o$) and an extraordinary refractive index ($n_e$); and a cladding of the material with the variable anisotropic refractive index or the same material dispersed in the matrix, said cladding disposed on the core and having an ordinary refractive index ($n_o'$) and an extraordinary refractive index ($n_e'$), wherein these indices satisfy the formula of $n_o > n_o'$ and $n_e \leq n_e'$, or the formula $n_e > n_e'$ and $n_o \leq n_o'$, whereby the waveguide device performs a mode filter function of propagating either of TE mode polarized light and TM mode polarized light.

2. A waveguide device according to claim 1, wherein $n_o$ is larger than $n_o'$ and $n_e$ is not larger than $n_e'$ so that said core can propagate the TE mode polarized light and radiate the TM mode polarized light.

3. A waveguide device according to claim 1, wherein $n_e$ is larger than $n_e'$ and $n_o$ is not larger than $n_o'$ so that said core can propagate the TM mode polarized light and radiate the TE mode polarized light.

4. A waveguide device according to claim 1, further comprising:

a substrate; and an undercladding on said substrate, wherein said waveguide layer is deposited on said undercladding.

5. A waveguide device according to claim 1, wherein a part of said waveguide layer comprises a mode filter which has a refractive index relation of selectively propagating either of the TE mode polarized light and the TM polarized light and radiating the other of the TE mode polarized light and the TM mode polarized light, and at least a portion of other parts of said waveguide layer comprises a grating having a refractive index modulating structure.

6. A waveguide device according to claim 5, wherein said grating is formed along a longitudinal direction of said core, and the refractive index modulating structure has a refractive index which varies periodically.

7. A waveguide device according to claim 1, wherein a part of said waveguide layer comprises a mode filter which has a refractive index relation of selectively propagating either of the TE mode polarized light and the TM polarized light and radiating the other of the TE mode polarized light and the TM polarized light, and at least a portion of other parts of said waveguide layer comprises a light modulator which varies a refractive index of light propagating within said waveguide layer in response to an applied electric field so as to modulate the light.

8. A waveguide device according to claim 7, wherein said light modulator comprises said core disposed in a central region of said light modulator, said cladding which includes first and second claddings facing each other and sandwiching said core, and a pair of electrodes for applying said electric field and disposed on said respective first and second claddings so as to sandwich said core of said light modulator.

9. A waveguide device according to claim 7, further comprising:

a substrate; and an undercladding on said substrate, wherein said waveguide layer is deposited on said undercladding, and said light modulator comprises a lower electrode disposed between said substrate and said undercladding and below said core, and an upper electrode deposited on said core of said light modulator in a manner to face said lower electrode.

10. A waveguide device according to claim 1, further comprising:

waveguide structures in which a three-dimensional refractive index is controlled so that planar refractive indices $n_x$, $n_y$ have different values from each other and a perpendicular-to-the-plane refractive index $n_z$ has a different value from $n_x$ and $n_y$, said structures being provided on an input end side to which signal light is coupled and on an output end side from which signal light is outgoing, and the waveguide device having a waveguide width on said input end side greater than a waveguide width on said output end side in the core.

11. A method of producing a waveguide device, comprising the steps of:

forming a waveguide layer of the waveguide device including a first part to become a core and a second part to become a cladding from a material with a variable anisotropic refractive index or the same material dispersed in a matrix;

irradiating light on either of the first and second parts, such that an ordinary refractive index ($n_o$) and an extraordinary refractive index ($n_e$) of the first part, and an ordinary refractive index ($n_o'$) and an extraordinary refractive index ($n_e'$) of the second part satisfy the formula of $n_o > n_o'$ and $n_e \leq n_e'$, the formula $n_e > n_e'$ and $n_o \leq n_o'$, wherein the steps of irradiating light on either of the first and second parts form a mode filter function of propagating either of TE mode polarized light and TM mode polarized light.

12. A method of producing the waveguide device according to claim 11, further comprising the step of:

irradiating light on at least a third part of said waveguide layer to form a grating having a refractive index modulating structure.

13. A method of producing the waveguide device according to claim 11, further comprising the step of:

applying an electric field to at least a third part of said waveguide layer to orient molecules and render optical nonlinearity of the material.

wherein the step of forming forms the waveguide layer from a material which exhibits a function of optical nonlinearity and which includes the variable anisotropic refractive index or the same material dispersed in a matrix.

14. A method of producing a waveguide device, comprising the steps of:

forming a waveguide layer of the waveguide device from a matrix material having a variable three-dimensional refractive index and planar refractive indices $n_x$, $n_y$ and a perpendicular-to-the-plane refractive index $n_z$ which can be varied by photoirradiation, and having said planar refractive indices $n_x$, $n_y$ which are isotropic and said perpendicular-to-the-plane refractive index $n_z$ which has a different value from $n_x$ and $n_y$; and irradiating polarized light which has a planar field direction on said waveguide layer, so that said planar refractive indices $n_x$, $n_y$ of said light irradiated part of said waveguide layer are decreased, and that with respect to said planar refractive indices $n_x$, and $n_y$, said decrease in refractive index in a direction corresponding to the field direction of said polarized light is greater than said decrease in refractive index in a direction not corresponding to the field direction of said polarized light.

* * * * *